United States Patent [19]

Regier et al.

[11] Patent Number: 5,244,100
[45] Date of Patent: Sep. 14, 1993

[54] APPARATUS AND METHOD FOR SORTING OBJECTS

[76] Inventors: Robert D. Regier, 25 Trout Lake Dr., Sanger, Calif. 93657; Jacob F. Hiebert, 23243 East Clayton, Reedley, Calif. 93654

[21] Appl. No.: 873,877

[22] Filed: Apr. 22, 1992

Related U.S. Application Data

[63] Continuation of Ser. No. 687,713, Apr. 18, 1991, abandoned.

[51] Int. Cl.$^5$ .......................... B07C 5/18; B07C 5/36; G01G 19/00
[52] U.S. Cl. ................................. 209/556; 177/145; 198/365; 209/580; 209/593; 209/701; 209/912; 209/939
[58] Field of Search ................ 209/539, 538, 555, 556, 209/563.6, 580, 592.6, 701, 912, 939, 652, 698; 177/145; 198/365, 779, 387

[56] References Cited

U.S. PATENT DOCUMENTS

| | | | |
|---|---|---|---|
| 466,043 | 12/1891 | Hunt | 198/706 |
| 1,846,808 | 2/1932 | Hohn et al. | 209/536 |
| 1,983,388 | 12/1934 | Moore | 209/581 |
| 2,954,113 | 9/1960 | Hibbard et al. | 198/803.01 |
| 3,013,661 | 12/1961 | Strubhar | 209/581 |
| 3,017,024 | 1/1962 | Mumma | 209/513 |
| 3,100,571 | 8/1963 | Reck et al. | 209/515 |
| 3,206,022 | 9/1965 | Roberts, Jr. et al. | 209/663 |
| 3,348,679 | 10/1967 | Russell | 209/545 |
| 3,489,278 | 1/1970 | Alexander | 209/593 |
| 3,768,645 | 10/1973 | Conway et al. | 209/565 |
| 3,770,111 | 11/1973 | Greenwood et al. | 209/580 |
| 3,842,968 | 10/1974 | Owens | 198/851 |
| 3,910,404 | 10/1975 | Henrekson | 198/835 |
| 3,930,995 | 1/1976 | Paddock et al. | 209/640 |
| 3,944,056 | 3/1976 | Feehery, Jr. | 198/348 |
| 4,033,450 | 7/1977 | Paddock et al. | 198/803.01 |
| 4,106,628 | 8/1978 | Warkentin et al. | 209/556 |

(List continued on next page.)

FOREIGN PATENT DOCUMENTS

| | | |
|---|---|---|
| 0034513 | 8/1965 | Fed. Rep. of Germany . |
| 2734278 | 2/1979 | Fed. Rep. of Germany . |
| 55-98010 | 7/1980 | Japan . |
| 1222497 | 4/1986 | U.S.S.R. . |
| 8908510 | 9/1989 | World Int. Prop. O. .......... 209/652 |

*Primary Examiner*—Donald T. Hajec

[57] ABSTRACT

An apparatus for sorting objects according to preselected weight and/or visually ascertainable criteria. Each object is singulated and transported between adjacent pairs of a plurality of roller assemblies attached to a conveyor chain to be freely rotatable on an vertically slidable axis oriented normal to the conveying path. A rotation control surface along the conveying path causes rotation in the roller assemblies and in the object supported therebetween, increasing the surface of the object accessible for optical scanning. Mounted between each pair of roller assemblies is a weighing cradle subtending the object transported therebetween. The weighing cradle elevates and captures the object from its support between roller assembly so that the cradle can engage a load cell for weighing the object. Pivotally mounted between each pair of rollers and subtending the object transported therebetween is an elongated discharge plate. Each object is unloaded at an appropriate discharge location by pivoting upwardly the discharge plate. Pivoting of the discharge plate is caused by the activation of a diverter arm at the discharge location. The activated diverter arm directs an orientation control surface attached to the discharge plate onto a ramp adjacent the conveying path. The apparatus involves a single sorter chain having attached thereto a plurality of component parts: roller assemblies, weighing cradles, discharge plates, and roller mounts. Roller assemblies, weighing cradles, and discharge plates are supported on the roller mounts, which are in turn releasably secured to the sorter chain.

76 Claims, 9 Drawing Sheets

U.S. PATENT DOCUMENTS

| | | | |
|---|---|---|---|
| 4,254,877 | 3/1981 | Rose | 209/594 |
| 4,262,807 | 4/1981 | Leverett | 209/592 |
| 4,299,326 | 11/1981 | Ulch | 209/564 |
| 4,308,959 | 1/1982 | Hoover et al. | 209/563 |
| 4,403,669 | 9/1983 | Raz | 177/145 |
| 4,413,690 | 11/1983 | Peterson | 177/54 |
| 4,420,051 | 12/1983 | Furuta et al. | 177/25.12 |
| 4,426,006 | 1/1984 | Horii et al. | 209/593 |
| 4,583,636 | 4/1986 | Tas | 177/52 |
| 4,586,613 | 5/1986 | Horii | 209/556 |
| 4,660,665 | 4/1987 | Powell, Jr. | 177/145 |
| 4,726,898 | 2/1988 | Mills et al. | 209/545 |
| 4,817,744 | 4/1989 | Power, Jr. | 209/592 X |
| 4,901,808 | 2/1990 | Wu | 177/145 |
| 5,029,692 | 7/1991 | Warkentin | 198/365 |
| 5,042,637 | 8/1991 | LaVars | 209/652 X |
| 5,101,982 | 4/1992 | Gentili | 209/698 X |

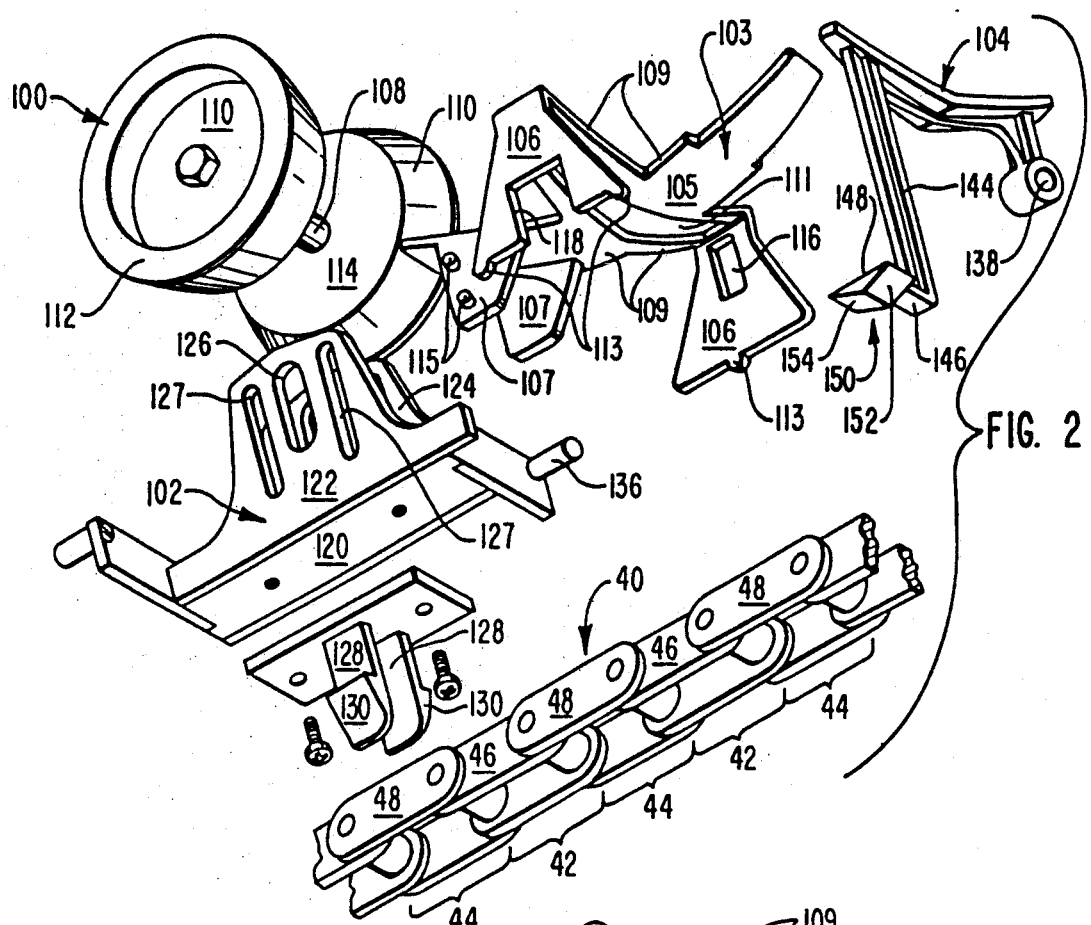
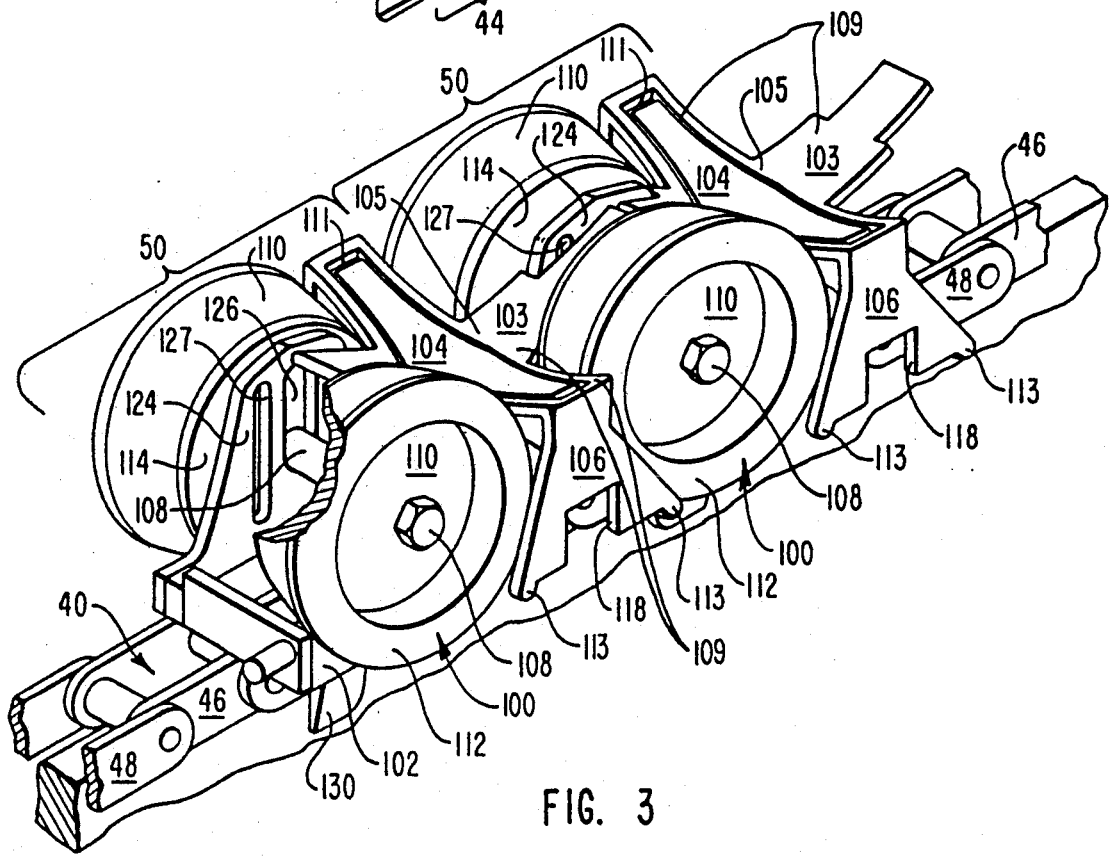
FIG. 2
FIG. 3

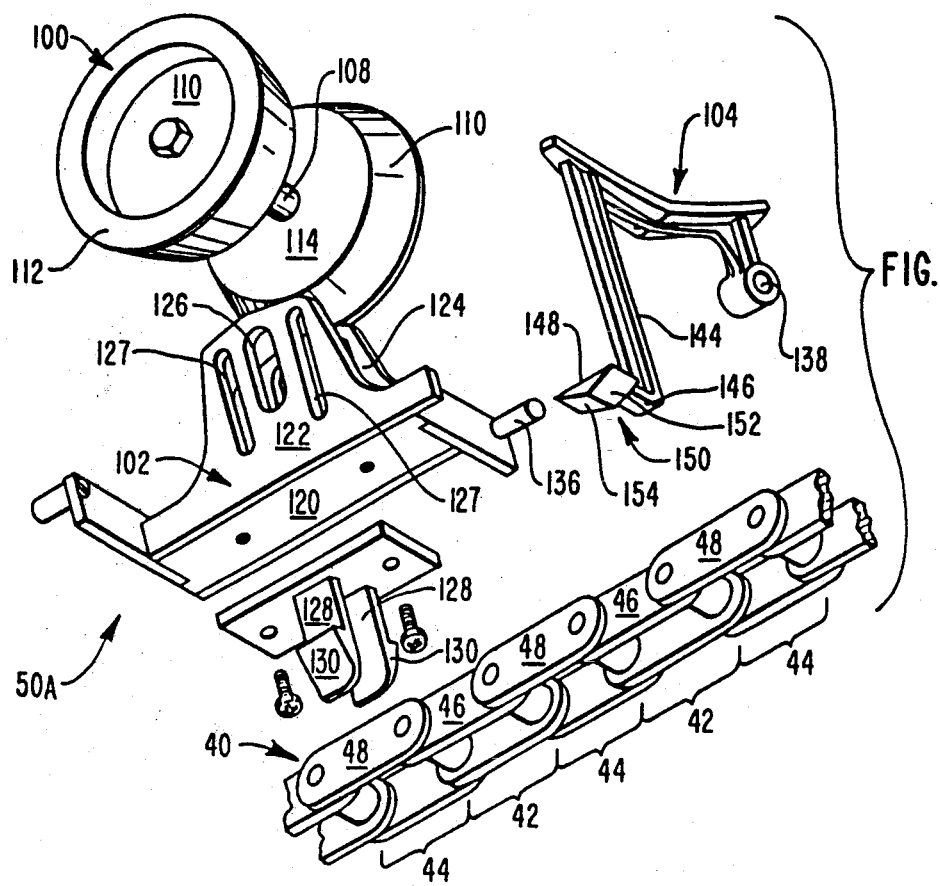
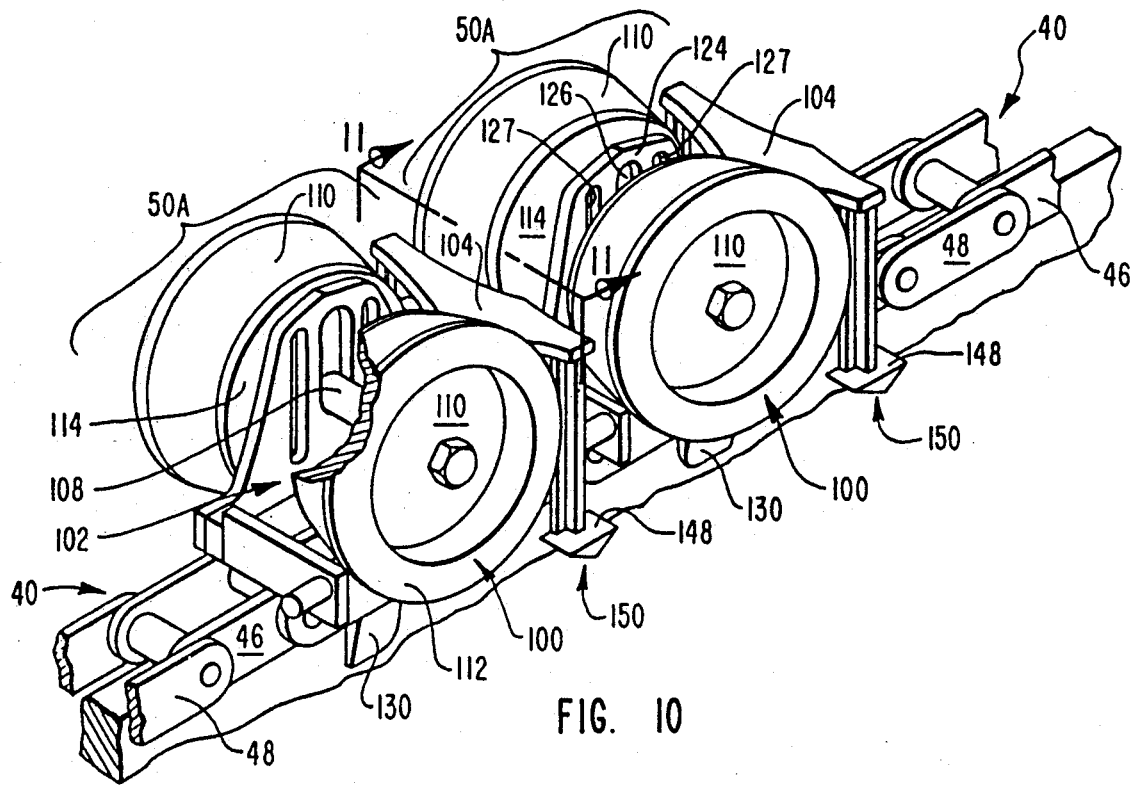

APPARATUS AND METHOD FOR SORTING OBJECTS

This application is a continuation of U.S. application Ser. No. 07/687,713 filed Apr. 18, 1991, now abandoned.

FIELD OF THE INVENTION

This invention relates to apparatus and methods for handling objects and, more particularly, to apparatus and methods for handling objects, such as articles of produce, for the purpose of sorting those objects according to weight and/or visually ascertainable criteria, such as size, color, and defectiveness.

BACKGROUND OF THE INVENTION

Prior to transporting harvested produce to market, one of the major tasks which must be performed is that of properly sorting the produce. Typically, produce is sorted and packaged using a number of criteria, including size, weight, shape, color, and quality.

The presorting of produce has a number of advantages for both consumers and produce growers. For example, through presorting, poor or spoiled produce can be removed prior to packaging, thereby reducing the likelihood of spoilage of the remaining produce during subsequent transportation and storage. The presorting of produce also permits consumers to purchase produce having general characteristics which are compatible with their needs. A restaurant owner, for example, may desire consistently to purchase some types of produce so that all of the pieces of such produce are of a substantially uniform size and quality. Further, the presorting of produce facilitates packaging and storing, since the sorted produce may usually be neatly arranged on trays or in crates.

In the past, the sorting of produce has been accomplished in a number of ways. Originally, produce was sorted entirely by hand, with the sorters being given instructions and training relating to the predetermined sorting criteria. Such a sorting method is tedious and quite imperfect, giving rise to numerous errors due to both human inconsistency and to varying applications of the sorting criteria by different individuals. Accordingly, although some hand sorting is still carried out in the produce industry, most produce sorting is now done mechanically.

One of the earliest types of mechanical sorters comprises an apparatus which conveys the produce over a series of holes or openings of progressively increasing size. For example, the produce may be directed over a series of rollers which are positioned progressively farther and farther apart. The smaller pieces of produce fall through the earlier rollers of the series, while the larger pieces are maintained on the rollers until the separation between successive rollers becomes large enough to admit them. By positioning separate collection devices or bins at various points beneath the rollers, the produce can thus be sorted according to size.

This somewhat crude apparatus for sorting produce by size has several significant drawbacks. Pieces of produce that are slightly too large to be received in a particular opening will on occasion nevertheless become jammed in that opening. Produce is damaged or bruised in this manner, as well as due to the fall necessitated. Pieces of produce also bounce across openings which are actually large enough to receive them, thereby falling through subsequent, larger openings and being sorted improperly.

Due to the above-mentioned drawbacks, attempts have been made to develop more efficient and reliable methods for sorting produce mechanically. One of the most promising sorting methods currently in use involves scanning the produce optically in order to ascertain its characteristics. This sorting method offers the potential for greatly increasing the accuracy and reliability of sorting by size, as well as the opportunity to sort on the basis of other visual characteristics.

Although the structural requirements for a suitable optical sorting apparatus vary somewhat depending upon the type of objects to be sorted, an effective optical sorting apparatus must generally perform three separate operations. First, the objects must be singulated (i.e., the individual objects must be separated physically one from another). Secondly, each object must then be individually scanned or examined in order to ascertain its characteristics. Finally, the individual objects must be sorted mechanically based upon the information obtained during scanning. Thus, an effective sorting apparatus must make provisions for effective singulating, scanning, and mechanical sorting.

These three individual functions may be performed, either by a single machine, or by a number of separate cooperating devices. Some optical sorting systems are quite complex, while others remain relatively simple.

Singulation of produce may be accomplished using a number of techniques. In one type of singulating mechanism, produce is spread in a single layer upon a relatively slow moving surface and then accelerated onto a second conveying means. The acceleration causes adjacent articles of produce to become separated slightly from one another. One device using this singulating principle employs a rotating right circular cone. The produce is advanced up the conical surface toward the apex of the cone and then allowed to recede toward the outer edges of the cone before being deposited onto a second conveyor. As articles of produce move away from the apex of the cone, their speed increases, thereby slightly separating adjacent pieces.

A second type of singulating mechanism comprises a conveyor which is formed of a plurality of cup-like carriers. As pieces of the produce are dropped onto this conveyor, each piece of produce is received in a separate carrier cup.

Once the produce has been singulated, each piece must then be optically scanned individually to ascertain its characteristics. Scanning may also be accomplished by several methods. One such method utilizes one or more photocells and corresponding light sources which are directed across the path of the produce at the photocells. For example, a photocell and a corresponding light source may be positioned to detect the passing of all produce of a particular height. By using a sequence of such photocells, the height of each individual article of produce can be determined. A second photocell and light source may be positioned adjacent the first to measure the length of each article of produce. This can be accomplished by connecting the second photocell to an appropriate timing and summing circuit.

Alternatively, it is possible to use a single two dimensional array of photocells and corresponding light sources. The size of each article of produce is then determined based on the magnitude of the total current emitted by the entire photocell array. Although both of these scanning methods have been somewhat successful in measuring size, it has not been possible to use them to determine other characteristics of the produce, such as color or quality.

The most promising optical scanning method currently in use employs an area-scan or line-scan camera. Such a camera can readily function to measure the size of an article of produce quite accurately, and some are capable of measuring the sizes of several articles of produce simultaneously. Perhaps more importantly, however, such cameras can be programmed to simultaneously determine the color of each article of produce, as well as to detect certain kinds of produce defects.

Once the characteristics used to distinguish articles of produce have been ascertained by scanning, the produce must be sorted mechanically in accordance with that predetermined sorting criteria. Sorting mechanisms for use with optical scanners are of two general types. The first employs a plurality of solenoid-activated rams which selectively knock individual articles of produce off the produce conveyor. The produce is thus grouped in an appropriate one of a series of storage containers in accordance with the sorting criteria.

A second type of sorting mechanism comprises a plurality of cup shaped carriers which each hold a single article of produce. The bottoms of individual carriers may be selectively opened by actuation of any one of a plurality of solenoids, each located adjacent a different storage container. The appropriate solenoid to be activated is determined based on the scanning data, thereby allowing each article of produce to drop through the cup-shaped carrier into one of the storage containers for grouping according to the preselected sorting criteria.

In use, one of the above-described sorting mechanisms is connected to an optical scanning mechanism in some suitable manner. For example, a solenoid-controlled ram may be positioned immediately adjacent a photocell to form a scanning and sorting station. If the photocell detects an article of produce of the appropriate size, the adjacent solenoid is actuated to knock that article of produce off the conveyor into an adjacent storage area. Otherwise, the article of produce is conveyed to the next scanning and sorting station for visual evaluation according to an adjusted size criteria.

Alternatively, scanning may be performed by a camera which is connected to a computer. The computer temporarily stores scanning information relating to the size, color, and/or quality of each article of produce. Being further provided with information relating to the speed of the produce conveyor, the computer is then able to trigger the appropriate sorting mechanism when each article of produce reaches the location at which it should be removed.

The mechanisms for singulating, scanning, and sorting produce may be combined in a number of ways to effectively perform the entire sorting operation. For example, one type of machine which performs each of the essential operations comprises a conveyor having a plurality of carrier cups, the bottoms of which are capable of being opened selectively by solenoids along the line of travel of the conveyor. One article of produce is dropped into each carrier cup and scanned by a camera. Each article of produce is then deposited into an appropriate one of a series of sorting containers by selectively actuating the solenoid located adjacent to the appropriate sorting container. This is perhaps the most common type of mechanical produce sorter currently in use.

Devices employing carrier cups do not effectively singulate the produce. It is very common, for example, for two or more articles of produce to be deposited into a single carrier cup or to be otherwise stacked on top of one another when being optically scanned. Although efforts have been made to create mechanisms that detect when produce stacking has occurred, there has been little success in doing so. Consequently, stacked articles of produce are often perceived by the scanning device of a sorter as a single article of produce and accordingly sorted improperly. This impairs the proper sizing of produce, and also makes it difficult to obtain an accurate count of the number of articles of produce that have been processed.

Other complications result because in order to accurately determine all of the desired characteristics of the produce, it is necessary to scan each article of produce from two or more directions. In sorting devices employing carrier cups, a defective article of produce may drop into a carrier cup oriented in such a manner that the defect is entirely on the bottom side thereof. As a result, a single scanning device located above the carrier cup cannot detect the defect as the article of produce is scanned.

A further problem is that such sorters are slow and inefficient in their use of space. For example, in known sorter devices using carrier cups individual articles of produce are typically positioned 6 to 12 inches apart on the produce conveyor. This results in a great deal of unused space between each article of produce, increasing needlessly the size of the sorter. As the maximum speed of the conveyor is limited by the resolution of the scanning device, a substantial amount of time is also wasted due to the distance between adjacent articles of produce being handled by the sorter.

Another type of sorting device that is known includes a sorting section which tilts the objects to the side of the conveyor after they have been scanned. Objects to be sorted by the device are conveyed to a scanning station. The optical scanning device detects preselected information about the objects which is stored in a data processing memory and thereafter used to operate the sorter section of the apparatus to selectively unload the objects by tilting them off the conveyor at different locations to group the objects according to preselected sorting criteria.

The sorter section of this type of device comprises a continuous chain and a plurality of distinct types of sorter pieces that are releasably attached to the chain. The sorter pieces include a mounting element releasably connected to the chain and formed with a flat elongated support face to uphold objects to be sorted and pivot pins. Each pivot pin receives a rocker element, which rests adjacent to and is generally coplanar with the support face of the mounting element. Once mounted, the rocker element is capable of upward pivoting about the pivot pin.

A mounting element and two rocker elements pivotally upheld on either side thereof together form a link set. Releasably securable directly to the top of chain at the outside of each link set is a spacer element. The top of each spacer element has an elongated flat support face which is similar in shape, orientation, and function to the support face on the top of each mounting element. When attached to the chain adjacent to a rocker element, each spacer element serves to hold the adjacent rocker element on the pivot pin. The chain is filled along its entire length by link sets and intervening spacer elements attached in the manner described. Each rocker element has a raised rib so that the space between the raised ribs of consecutive pairs of rocker elements defines a carrying pocket which receives individual objects from the scanning station of the apparatus.

Simultaneous pivoting of the two consecutive rocker elements at the sides of a carrying pocket causes the rocker element support faces to encounter the object in the carrying pocket. Further pivoting of the rocker elements will then lift and tilt the object off the conveyor, tipping the object off the side of the sorting section. In this manner individual objects can be selectively removed at any of a number of different sorting locations along the sorter section.

The process of pivoting consecutive pairs of rocker elements to tilt an object out of the conveying pocket therebetween does not require striking the object. The motion involved is smooth and gradual and does not cause damage to the objects. Nevertheless, even the improved sorter section components are afflicted with significant disadvantages.

For example, emptying a single conveying pocket requires the upward tilting of both rocker elements on either side thereof. This has been accomplished through the use of a projecting foot extending from each rocker element and a plurality of stationary ramps located along the chain near the line of travel of the projecting feet of the rocker elements. Movement of the chain along its path of travel draws the projecting feet toward and past each ramp. The projecting feet are configured to not interact with the ramps unless acted upon. In this manner, unloading of objects of produce does not occur unless the unloading is desired.

If unloading of a specific object at a given discharge point is appropriate, a selectively operable diverter arm near the lead end of a ramp is mechanically or electrically brought into an activated position. In that position, the projecting feet of the two rocker elements on either side of the object are diverted out of their normal line of travel, onto and over the ramp. In the process, the rocker elements to which the two projecting feet are attached are tilted upwardly, lifting and tipping the object within the carrying pocket from the chain.

Two functional flaws have become apparent in this manner of operation. For a moving chain, the upward motion imparted to any pair of rocker elements is not strictly simultaneous because the projecting feet do not encounter the ramp simultaneously. The projecting foot for the lead rocker element encounters the diverter arm before the projecting foot for the trailing rocker element. Correspondingly, the lead side of any object in the carrying pocket, will be lifted in advance of the trailing side of that same object. Hence, rather than directing the object from the chain in a direction normal thereto, objects discharged from the sorting section of the device are tipped from the chain in an imprecise manner.

Furthermore, the mechanics of raising both rocker elements together in order to discharge a single object is complicated. For each single object discharged, the diverter arm must remain in its activated position long enough for two rocker elements to be drawn past. This mechanical functioning is a challenge to coordinate. It requires highly precise operation of the machinery, and, where an attempt is made to automate the sorter, it requires complex software.

Another disadvantage results from each rocker element sharing adjacent conveying pockets. The practical consequence is that objects in the adjacent conveying pockets are jostled when an object within a conveying pocket is discharged. An ideal sorter would permit each object to be unloaded individually, without imparting movement of any kind to objects being carried in adjacent conveying pockets.

In order to avoid this result, objects are frequently carried only in alternate, rather than in successive, conveying pockets. As a result, however, half of the length of the chain of the sorter section of such devices is empty. The object handling rate of the device is thus effectively halved, and complicated feed mechanisms must be devised for supplying objects from the scanning station to the sorting section so that only alternate conveying pockets are filled.

Over the years, many articles of produce have been graded or classified by weight. Various sorting apparatus have been developed to weigh objects in conveyance. Typically, the weighing is performed by passing the object to be weighed over a load cell which records the weight. The manner in which the weighing is performed significantly impacts the accuracy of the weighing and the efficiency of the sorting apparatus.

Known sorting apparatus have had difficulty with the accuracy of weight measurements because the position of the object within a tray or cup can affect the weight measurement. If the objects sorted were asymmetrical, there have been problems with the center of gravity of the object being off-centered thereby causing some inaccuracy in the weight measurement. Another problem has been that the lead portion and the trailing portion of each tray or cup does not pass over the load cell simultaneously.

More importantly, however, it has become desirable to sort objects according to multiple criteria, including weight, size, color, and/or defect. The known sorting devices which grade or classify objects by weight take the weight measurements at a weighing section of the device and must transfer the objects to another section of the device for further classification. Such transfers have a traumatic effect on the objects because a transfer usually requires the object to be dropped from one conveyor to another. Also, if the sorting by weight is performed before sorting by other criteria, separate facilities for performing the sorting must be provided for each conveyor transporting the objects which have been classified by weight. Such separate facilities occupy valuable space making the sorting devices large and expensive to purchase, maintain, and operate.

SUMMARY OF THE INVENTION

One object of the present invention is an improved method and apparatus for handling, and especially for optically sorting, objects such as articles of produce, in which singulating, scanning, weighing, and sorting functions can be performed on one conveyor, minimizing the transfers of objects during handling.

It is also an object of the present invention to provide such method and apparatus wherein the scanning of more than one side of each of the objects is accomplished by rotating the object and in which such scanning takes place in the same conveying pocket in which the objects are singulated, transported, weighed, and ultimately unloaded according to predetermined sorting criteria.

It is a further object of the present invention that in such a method and apparatus, the objects are substantially adjacent during handling to minimize the overall size of the apparatus and to enhance the speed of its operation. Thus, it is an object of the present invention that all conveying pockets for objects be fully usable without creating any operating disadvantage in adjacent conveying pockets. In this regard, a further, related object of the present invention is to permit the discharge of objects from such a device without affecting the stability of an object in an adjacent conveying pocket.

Yet another object of the present invention is to provide a method and apparatus in which discharge is effected simply, utilizing only a single element to tilt and discharge an object, without imparting any backward or destabilizing motion to the objects being discharged.

Still another object of the present invention is to effect the discharge of objects in a method and apparatus through the use of a minimum number of moving parts for each object handled. As a further related objective, the present invention aims to minimize the inventory of different parts required for attachment to the chain of a mechanical sorter.

A further object of the present invention is to provide an apparatus that can perform multiple sorting inspections, including weighing, without transferring the object from one conveyor to another, thus reducing the traumatic effect of transfers.

Yet another object of the present invention is to provide an apparatus which is capable of maximizing the accuracy of the weight measurements taken of the objects in conveyance.

Still another object of the present invention is to provide an apparatus wherein the weighing feature can be deployed or removed, at the option of the user.

Additional objects and advantages of the invention will be set forth in the description which follows, and in part will become apparent from the description, or may be learned by the practice of the invention. The objects and advantages of the invention may be realized and obtained by means of the instruments and combinations particularly pointed out in the appended claims.

Broadly stated, to achieve the foregoing objects, a mechanical sorter and a corresponding method is provided which employs a single conveyor chain and chain attachment assemblies releasably secured thereto that are each comprised of a minimum of interacting parts. Each chain attachment assembly singulates the objects or articles of produce, transports them through the apparatus, rotates them to permit full optical scanning, weighs each individual object, and discharges them using a non-damaging, smooth tilting motion using but a single movable component. All processing of each object is provided by a single object handling unit that comprises two adjacent pairs of rollers, a Weight cradle, and an elongated discharge plate. The rollers alone support the object and impart rotation to the object when rotation is desired. Between the rollers and below the object is a single, pivotally mounted elongated discharge plate that effects unloading. Optionally, a weight cradle is disposed between the rollers and is capable of lifting the object for weighing.

BRIEF DESCRIPTION OF THE DRAWINGS

In order to more fully describe the manner in which the advantages and objects of the present invention are obtained, a more particular description of the presently preferred embodiments of the invention will be described with additional detail through the use of the following drawings in which:

FIG. 2 is an exploded perspective view of a sorter chain and the components of a chain attachment assembly employing a weighing cradle for attachment thereto in the sorter apparatus shown in FIG. 1;

FIG. 3 is a detailed perspective view of an adjacent pair of chain attachment assemblies employing weighing cradles attached to the sorter chain of the sorter apparatus shown in FIG. 1;

FIG. 9 is an exploded perspective view of an alternative embodiment of the sorter chain of the present invention and the components of a chain attachment assembly absent a weighing cradle;

FIG. 10 is a detailed perspective view of an adjacent pair of chain attachment assemblies according to the alternative embodiment shown in FIG. 9 absent weighing cradles;

DESCRIPTION OF THE PREFERRED EMBODIMENTS

The object handling apparatus of the present invention may be used for a number of different purposes, but that disclosed herein finds its primary utility as a mechanical sorter, particularly of objects, such as produce, which are typically sorted on the basis of weight and/or visual characteristics and which require careful handling to prevent or minimize damage to the objects being sorted.

Figure 1:
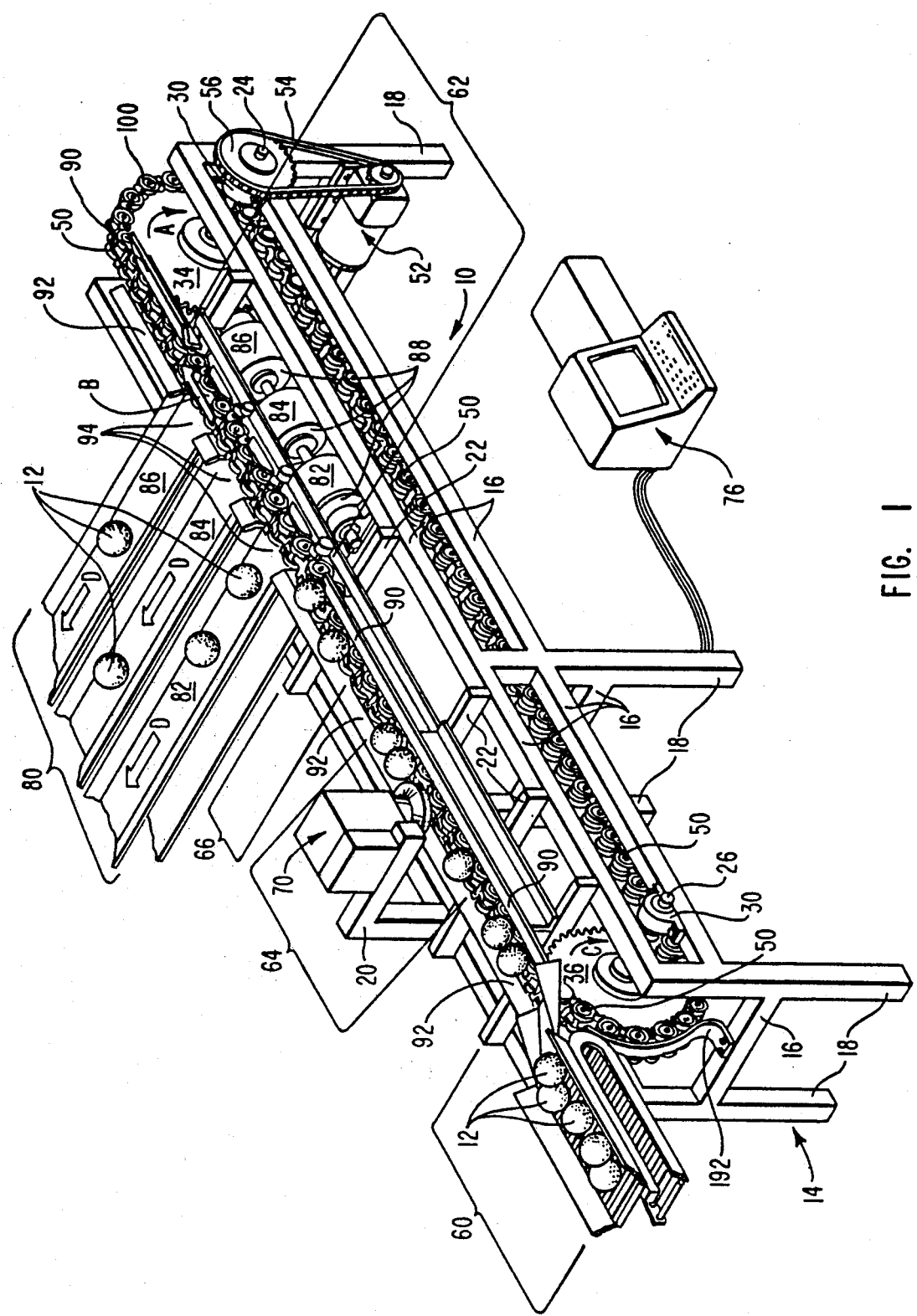
FIG. 1 is a diagrammatic perspective view of one presently preferred embodiment of a sorter apparatus according to the present invention.

FIG. 1 provides an overview of the major subcomponents of one embodiment of a mechanical sorter 10 configured according to the teachings of the present invention. Mechanical sorter 10 is particularly adapted to the sorting of articles of produce 12 shown in various stages of processing by mechanical sorter 10.

The various functional elements of mechanical sorter 10 are supported upon a frame 14 which may be configured in any suitable manner from a rigid material, such as steel. Frame 14 may take the form shown in FIG. 1 comprising a plurality of horizontal rails 16 supported by a number of vertical legs 18. It may be desirable in some instances to mount frame 14 permanently within a building or to form it as an integral part of a building structure. On the other hand, it may be desirable to construct frame 14 such that mechanical sorter 10 may be easily transported from one place to another. Advantageously in such circumstances, legs 18 of frame 14 could be provided with adjustable feet (not shown) to facilitate the leveling and stabilizing of frame 14.

Any frame, such as frame 14, for use with a specific embodiment of a sorter incorporating the teachings of the present invention will necessarily include additional, less substantial elements tailored to the needs of that embodiment for supporting individual functional components thereof. An example of such a less substantial supporting element can be observed in frame 14 of mechanical sorter 10 in the form of overhead booms 20 and cross-pieces 22, the functions of which will become apparent subsequently.

Rotatably mounted to frame 14 are axle rods 24 and 26 which are set in bearings 30 attached to a horizontal rail 16 thereof. Axle rods 24 and 26 have secured thereto sprocket wheels 34 and 36, respectively, which lie substantially in the same vertical plane. Although not shown, a sprocket wheel intermediate of sprocket wheels 34 and 36 could be provided as auxiliary support for the structure mounted on sprocket wheels 34 and 36.

Movably suspended from frame 14 on sprocket wheels 34 and 36 is a sorter chain 40 comprised of a plurality of links connected one to another to form an endless loop. As best seen in FIGS. 2 and 3, sorter chain 40 may comprise a double pitch roller chain comprised of alternate roller links 42 and pin links 44 which form alternate narrow side plates 46 and wide side plates 48, respectively.

Attached to sorter chain 40 are a plurality of chain attachment assemblies 50 shown diagrammatically without substantial detail in FIG. 1, but disclosed with specificity in relation to FIGS. 2 and 3 subsequently. A motor 52 mounted to frame 14 is operatively connected through a drive belt 54 and a sprocket drive wheel 56 on axle rod 24 to rotate sprocket wheel 34 in the direction shown by arrow A. In combination motor 52, drive belt 54, and sprocket drive wheel 34 serve as a typical drive means for advancing the upper portion of sorter chain 40 in the direction indicated by arrow B. Sprocket wheel 36, being interconnected with sorter chain 40, follows in rotation in the direction indicated by arrow C.

In this manner, the upper portion of sorter chain 40 defines a conveying path between a produce input station generally indicated at the bracket 60 and a produce output station generally shown at bracketed portion 62. Intermediate produce input station 60 and produce output station 62 along the conveying path is a scanning station indicated generally at the bracketed portion 64 and a weighing station indicated generally at the bracketed portion 66. At input station 60, produce 12 is fed onto sorter chain 40 by a suitable feed mechanism 68 and singulated by chain attachment assemblies 50 prior to further processing. It is the nature of chain attachment assemblies 50 that produce 12 is then rotatably supported and transported along the conveying path to scanning station 64 and then on to weighing station 66.

At scanning station 64, articles of produce 12 are inspected for the purpose of ascertaining how each is to be sorted. Thus, scanning station 64 includes a scanning means for detecting in individual articles of produce 12 the presence of any predetermined sorting criteria by which grouping thereof is to be effected. As shown in FIG. 1, by way of example and not limitation, a single optical scanning device 70 such as a solid state camera, is supported on overhead boom 20 above the conveying path defined by the upper portion of sorter chain 40.

Produce 12 being transported along that conveying path from input station 60 to output station 62 pass within the range of the optical scanning device 70 which detects preselected information about the size and/or visual appearance of each article thereof. The information is transmitted to and stored in the data processing memory of a computer 76 and used thereafter, according to the speed of sorter chain 40, to operate mechanisms in output station 62 for grouping produce 12 in accordance with predetermined sorting criteria.

Use of optical scanning device 70 which can be a solid state camera, is considered highly advantageous to the sorting of produce 12 in accordance with visual characteristics other than just size. Nevertheless, optical scanning devices 70 can also, within the scope of the teachings of the present invention, comprise one or more pairs of corresponding photo cells and light sources, or even two-dimensional arrays of such, if size is the only sorting criteria to be employed. On the other hand, there may be instances in which object scanning in other than visual modes, such as ultrasonic, radiation, or x-ray scanning, is appropriate in the handling and sorting of objects according to the teachings of the present invention. These methods of non-visual scanning are, accordingly, considered to be within the scope of the scanning means of the present invention. It should also be noted that at slow enough speeds of sorter chain 40, the detection of predetermined sorting criteria in objects, such as articles of produce 12, could be accomplished by agricultural laborers, although in all probability without taking advantage of the benefits of speed, efficiency, and accuracy available through mechanized forms of scanning.

It is a significant feature of the method and apparatus of the present invention that during the time that produce 12 is traversing scanning station 64, it may be selectively rotated on a continuing or occasional basis, and to any predetermined extent, while supported by chain attachment assemblies 50. This activity is undertaken in order to increase the surface area of produce 12 that is accessible to a scanning means, such as optical scanning device 70. The manner in which this rotation is accomplished will be more easily appreciated once the detailed structure of chain attachment assemblies 50 has been elaborated subsequently.

In any case, however, the precise physical relationship between the point or points along the conveying path in scanning station 64 at which this rotation is effected and the point or points at which scanning occurs is entirely a function of design convenience. Some optical scanning devices (for example, an area-scan camera), in cooperation with suitable data processing hardware and software, will be able to detect and gather data about the surface of articles of produce 12 while these are in the process of being rotated. In such cases, the point at which rotation occurs should be within the range of the optical scanning device employed.

On the other hand, computer software or hardware limitations, or the optical characteristics of the optical scanning device utilized, may permit the effective detection of visual characteristics only if the objects scanned are not in rotation during scanning. Under such circumstances, objects can be scanned at a first point along the conveying path, rotated a preselected amount, as for example 90° or 120° at a second point on the conveying path, and then scanned again at a third successive point on the conveying path. Additional alternate rotations and scannings to the extent desired can be used to afford access to the entire surface of the objects involved. Thus, in order to utilize intermittent rotation of articles of produce 12, multiple optical scanning devices, such as line-scan cameras, may be required.

Produce 12 being transported along the conveying path from input station 60 to output station 62 also passes through weighing station 66 which weighs each individual article of produce 12. The weight information is transmitted to and stored, along with other sorting criteria information, in the data processing memory of computer 76 and used thereafter to operate mechanisms in the output station 62 for grouping produce 12 in accordance with predetermined sorting criteria.

A load cell 78 (best shown in FIGS. 6 and 7), disposed along side the sorter chain 40, is used to weigh the produce 12. As produce traverses the weighing station 66, each individual article of produce 12 is elevated or lifted in a cradle that is drawn across the load cell 78 in a manner to be described in more detail hereinafter. The cradle and article of produce 12 are weighed and that information is transmitted to the computer 76 to be considered along with other sorting criteria.

Once scanned and weighed, produce 12 is advanced by movement of sorter chain 40 in the direction of arrow B into output station 62 where articles of produce 12 are selectively and individually unloaded from sorter chain 40 at appropriate discharge locations. The produce 12 discharged from sorter chain 40 at each discharge location is collected separately, resulting in produce 12 being sorted according to the preselected sorting criteria.

Thus, in accordance with the present invention, collection means are provided, located at object output station 62, for receiving selected produce 12 unloaded from sorter chain 40. As shown in FIG. 1 by way of example, and not limitation, mechanical sorter 10 includes a collection conveyor shown at bracket 80 having a plurality of parallel movable belts, 82, 84, 86 extending beneath sorter chain 40 at each discharge location in output station 62. The belts 82, 84, and 86 of collection conveyor 80 are driven in the directions shown by arrows D by individual collection conveyor motors 88. Produce 12 unloaded from sorter chain 40 is thus received on one of the belts 82, 84, and 86 of collection conveyor 80 and moved away from sorter chain 40 in a direction normal to the conveying path. The number of belts in a collection conveyor, such as collection conveyor 80, is adjusted to correspond to the number of discharge locations at output station 62 of the mechanical sorter 10.

As depicted in FIG. 1, retaining walls 90 and 92 are positioned adjacent each side of sorter chain 40 along the conveying path defined by the upper portion thereof. Retaining walls 90 and 92 slope downwardly toward a position closely adjacent to chain attachment assemblies 50 on sorter chain 40. Retaining walls 90 and 92 thus prevent produce 12 from rolling off the side of sorter chain 40 while being singulated at output station 60 or rotatably supported and transported through scanning station 64 or elevated and weighed at weighing station 66. Retaining wall 90 extends without interruption substantially the full length of mechanical sorter 10. Retaining wall 92, however, is on the side of sorter chain 40 on which articles of produce 12 are discharged in output station 62. Therefore, in output station 62, retaining wall 92 is interrupted by openings 94 corresponding to each of the discharge locations at which belts 82, 84, 86 of collection conveyor 80 are located. Belts 82, 84, and 86 of collection conveyor 80 are each positioned directly beneath openings 94 in retaining wall 92, preferably as close to sorter chain 40 as possible. Thus, produce 12 may be diverted from sorter chain 40 onto belts 82, 84, 86 without falling any significant distance. Supplementally, inclined ramps (not shown) may be provided bridging the height between each opening 94 and the corresponding belt of collection conveyor 80 in order to provide a smoother transition for diverted produce 12.

The overview of the function and structure of mechanical sorter 10 completed above will now permit a clear understanding of the nature of chain attachment assemblies 50 and the manner in which articles of produce 12 are singulated, rotated for scanning, weighed, and ultimately removed from sorter chain 40. In FIG. 2, the components of a preferred embodiment of a chain attachment assembly incorporating teachings of the present invention are shown individually to illustrate the manner of their assembly with each other and with sorter chain 40. By way of example, each chain attachment assembly 50 comprises a roller assembly generally designated at 100, a roller mount 102, a weighing cradle 103, and a discharge plate 104. In FIG. 3, two sets of the same components are depicted assembled one next to another and removably attached in succession to sorter chain 40.

The components of a chain attachment assembly 50 according to the present invention may be formed in a wide variety of different configurations and of virtually any suitable material. Roller assembly 100, roller mount 102, weighing cradle 103, and discharge plate 104 may be formed of metal, rubber, molded plastic, and/or combinations thereof. It is preferred, however, that the components be made of molded plastic so that the components are relatively light, to facilitate their handling, to be manufactured inexpensively, and to be easily replaced when damaged.

Roller assembly 100 comprises an axle 108 and a pair of wheels 110 each having a frusto-conical periphery. The frusto-conical peripheries of each wheel 110 are oriented such that the larger end of each is more remote from the longitudinal center of chain 40 than the smaller end of each. In this orientation, each wheel 110 has a flat annular end face 112 and a flat circular inner face 114. Each roller assembly 100 is configured with the wheels 110 disposed in spaced relation to each other so that axle 108 is utilized to rotatably mount each roller assembly 100 in a corresponding roller mount 102.

It is one function of roller mount 102 to support a roller assembly 100 for rotation about the axis thereof. Each roller mount 102 is in turn directly attached to sorter chain 40. Roller mount 102 includes an elongated planar floor portion 120 having along its longitudinal edges two upwardly turned, parallel side plates 122 and 124 each having an elongate axle slot 126 formed centrally therein and post slots 127. Axle 108 extends through axle slots 126 and is slidable therein vertically. In this position, side plates 122 and 124 do not press against the inner faces 114 of the roller assembly 100, thereby permitting the roller assembly 100 to slide vertically and/or rotate freely about the axis defined by axle 108.

Figure 4:
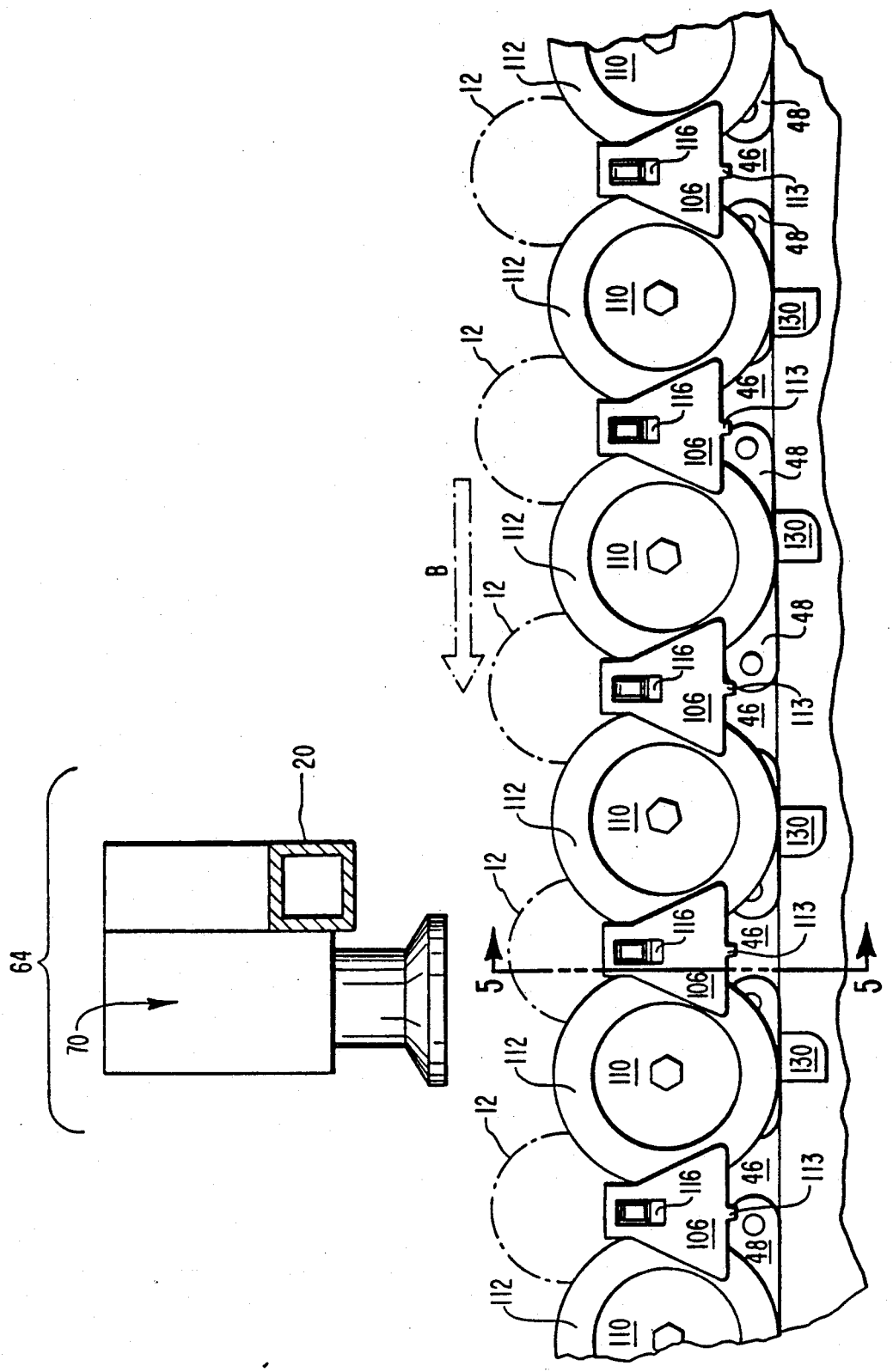
FIG. 4 is a detailed elevation view of the sorter apparatus of FIG. 1 taken at the optical scanning station thereof.

It should be understood, however, that the axle slot 126 may also be configured as a circular bore of slightly larger diameter than the diameter of axle 108. In such case, the axle 108 will not slide vertically, but rather will be capable of rotation only. This embodiment is preferred and suitable particularly for the sorting of large articles of produce 12, such as grapefruit, because rotation can be imparted to the produce 12 without a need to lift the produce 12. See FIG. 4 for an illustration of an article of produce passing through a scanning station 64 without being lifted for rotation.

According to the present invention, fastening means are provided for releasably securing a roller mount, such as roller mount 102, to sorter chain 40. As best shown in FIG. 2, by way of example and not limitation, a pair of resilient legs 128 depend from floor portion 120 of roller mount 102 on the side thereof opposite from side plates 122 and 124. The end of each leg 128 remote from roller mount 102 is formed into a hook 130. In the embodiment shown, hooks 130 extend outwardly from each of resilient legs 128.

Roller mount 102 is releasably secured to an individual link of sorter chain 40 by the insertion of resilient legs 128 within, for example, wide side plates 48 of pin links 44 thereof. Roller mount 102 is advanced toward its seated position on pin link 44, and hooks 130 cause resilient legs 128 to be forced inwardly toward each other by wide side plates 48. Once hooks 130 have passed the bottom edge of wide side plates 48, resilient legs 128 snap outwardly into their original positions, and hooks 130 extend around the bottom of wide side plates 48 to retain roller mount 102 on sorter chain 40. Roller mount 102 may be detached from sorter chain 40 by pressing resilient legs 128 toward each other so that hooks 130 clear the bottom edges of wide side plates 48, permitting the withdrawal of resilient legs 128 from pin link 44.

It should be understood that through properly proportioning the distance between resilient legs 128, roller mount 102 could be fabricated to be releasably secured in a similar manner to narrow side plates 46 of roller links 42. Although the arrangement depicted in FIG. 2 is considered preferable, the distance between resilient legs 128 could be increased to fit around the outside of an individual link of sorter chain 40, and hooks 130 at the ends thereof be oriented inwardly to fit around the bottom of the sides of individual links of sorter chain 40 from the outside thereof. To release roller mount 102 from sorter chain 40 it would then be necessary to force resilient legs 128 outwardly.

The weighing cradle 103 of the present invention comprises a concave saddle 105, side legs 106, and ears 107. The concave saddle 105 comprises four outwardly extending wings 109 each having a concave, upwardly inclined configuration, together forming a lifting pocket within which produce 12 may be captured and elevated. When the concave saddle 105 is disposed for operation of the present invention, two of the wings 109 align in the direction of the chain 40 and the other two wings 109 align transverse to the direction of the chain 40. The concave saddle 105 has a peripheral configuration that conforms to occupy the space between adjacent roller assemblies 100 and the wheels 110 of each roller assembly 100, as illustrated best in FIG. 3. A discharge slot 111 is provided in the concave saddle 105. The discharge slot 111 is disposed centrally to the concave saddle 105 and transverse to the direction of chain 40, and has a configuration corresponding to and slightly larger than the shape of the top portion of discharge plate 104.

A side leg 106 descends vertically from the outermost reach of each of the transverse wings 109. The side legs 106 are configured such that they support the full weight of the weighing cradle 103 and any article of produce 12 cradled therein as the sorter chain 40 passes the weighing cradle 103 over load cell 78 at the weighing station 66. Guiding nubs 113 are provided to assist in guiding the side legs 106 over a ramp onto the load cell 78 and to facilitate accurate weight measurement.

The ears 107 descend vertically from each side of at least one of the wings 109 aligned in the direction of the chain 40. Each ear 107 has at least one protruding post 115 configured for slidable engagement within a vertical post slot 127 disposed in side plates 122 and 124.

Another element of each chain attachment assembly 50 is elongated discharge plate 104. As shown in FIG. 3, when assembled with the other elements of chain attachment assembly 50 secured to sorter chain 40, discharge plate 104 is supported on a roller mount 102 in a substantially horizontal position between roller assemblies 100 of adjacent pairs of chain attachment assemblies 50. As shown, discharge plate 104 is upwardly concave and has longitudinal edges 132 which oppose and generally match the profile of the discharge slot 111 within the concave saddle 105.

As best understood by reference to FIG. 2, mounting of discharge plate 104 in a chain attachment assembly 50 involves a pivot pin 136 that extends from end plate 122 of roller mount 102 parallel to the conveying path. Correspondingly, discharge plate 104 is provided at one end thereof with a pivot pin bore 138 which is slightly larger in cross section than that of pivot pin 136. Pivot pin bore 138 is slidably received on pivot pin 136 to mount discharge plate 104 to roller mount 102. In this manner, discharge plate 104 is rendered capable of rotational motion about pivot pin 136.

Figure 5:
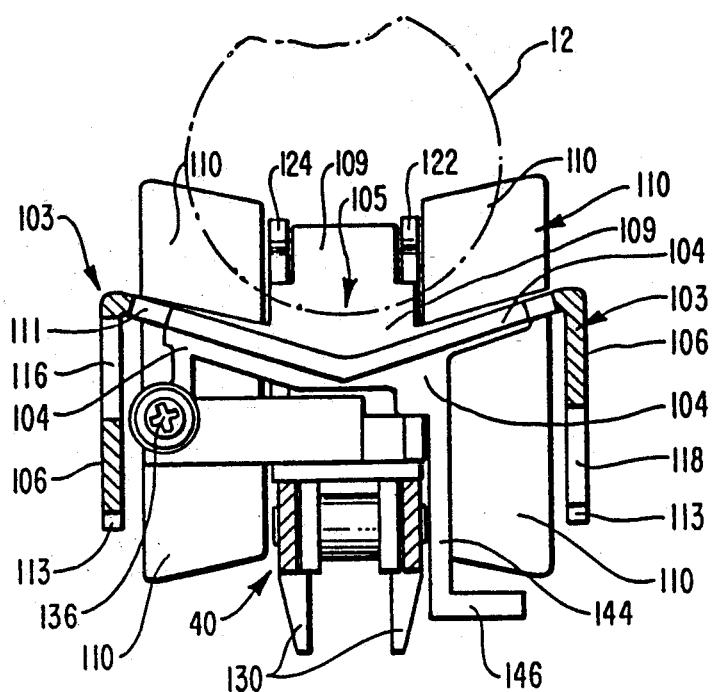
FIG. 5 is a cross-sectional elevation of an object handling unit of the device shown in FIG. 1 taken along section line 5—5 of FIG. 4.

As best shown in FIG. 5, The underside of discharge plate 104 rests upon roller mount 102 thereby preventing downward rotation of discharge plate 104 from a substantially horizontal disposition. Thus, discharge plate 104 is capable only of upward tilting movement about pivot pin 136 therefrom.

By the attachment to sorter chain 40 of successive chain attachment assemblies 50, each discharge plate 104 is retained on its corresponding pivot pin 136. In a series of successive chain attachment assemblies 50 attached to the same sorter chain 40, the pivot pin 136 is disposed between the outermost edge of adjacent wheels 110. This blocks the removal of corresponding discharge plate 104 from the pivot pin 136 on which it is mounted. Each chain attachment assembly 50 attached to sorter chain 40 in a sequence cooperates with an adjacent chain attachment assembly 50 to maintain discharge plate 104 thereof in proper position. This relationship may best be appreciated by reference to FIG. 4.

An additional feature of discharge plate 104 requires explanation prior to passing from FIGS. 2 and 3 to a discussion of the manner in which the components of chain attachment assembly 50 cooperate to perform the various functions thereof. Depending from discharge plate 104 at the end thereof opposite from pivot pin bore 138 is a finger 144. Extending normal to finger 144 at the remote end thereof is a foot 146 which projects away from pivot pin bore 138 in a direction generally parallel to the length of discharge plate 104. Foot 146 has a generally horizontal upper surface 148 and a lower surface 150, which will be referred to hereafter as an "orientation control surface." Orientation control surface 150 comprises two upwardly inclined faces 152 and 154, so that foot 146 has a generally triangular cross-section. Orientation control surface 150 is used in a manner to be described subsequently to tilt discharge plate 104 upwardly about pivot pin 136 from the substantially horizontal position of discharge plate 104 in which it rests on roller mount 102.

To accommodate the upward pivot or tilting of discharge plate 104, the side leg 106 adjacent the pivot pin 136 has a window 116 to permit passage of a portion of the discharge plate 104 therethrough. Similarly, the side leg 106 adjacent the foot 146 has a notch 118 to permit passage of a portion of the foot 146 therethrough.

In summary, each chain attachment assembly 50 comprises a roller assembly 100 rotatably supported by and vertically slidable in a roller mount 102 which also supports slidably a weighing cradle 103 and to which is pivotally mounted a discharge plate 104. Each chain attachment assembly 50 thus includes one of each of the distinct components which are attached directly or indirectly to the chain 40 of a mechanical sorter 10 according to the teachings of the present invention to achieve the aforementioned objects thereof. The chain attachment assembly 50 is thus helpful in understanding the manner in which those components are attached and maintained on a sorter chain 40. Nevertheless, a complete grasp of the interaction and cooperative functioning of the elements attached to a sorter chain 40, is facilitated by a discussion of those basic components, the roller assembly 100, the roller mount 102, the weighing cradle 103, and the discharge plate 104, in various other functional groupings which will be defined and utilized in the explanations which follow. In terms of function, each chain attachment assembly 50 serves to attach to and maintain on sorter chain 40 one of each of the elements by which the singulating, object rotating, object weighing, and object discharging functions of mechanical sorter 10 are accomplished.

Returning to FIG. 1, in input section 60 of mechanical sorter 10, articles of produce 12 are supplied by way of feed mechanism 68 to the plurality of chain attachment assemblies 50 secured to sorter chain 40. There, the rotatably mounted roller assemblies 100 in chain attachment assemblies 50, in cooperation with retaining walls 90 and 92, singulate articles of produce 12 so that successive articles of produce 12 are thereafter transported by sorter chain 40 substantially adjacent to one another. As used herein, the term "substantially adjacent" when applied to objects, such as produce 12 transported on sorter chain 40, means that individual objects are neither stacked on top of one another nor separated by a significant distance.

The freely rotatable round upper surfaces of the wheels 110 of roller assemblies 100 in roller mounts 102 constitute the only surface encountered by produce 12 being fed onto mechanical sorter 10 by feed mechanism 68. The surface thus presented is one upon which no stacking or piling of produce 12 can occur. The series of freely rotatable surfaces presented by the wheels 110 of roller assemblies 100 render it impossible to support the weight of any articles of produce 12 piled on top of one another. The only stable position that may be assumed by an article of produce 12 is one between adjacent wheels 110. The shape of the roller assemblies 100 in chain attachment assemblies 50 in cooperation with the inclined surface retaining walls 90 and 92, direct produce 12 to the center of the conveying path defined by the top portion of sorter chain 40, where individual articles of produce 12 settle into positions between adjacent pairs of chain attachment assemblies 50. The components of chain attachment assemblies 50 are so sized to facilitate this singulating process. In particular, the relatively large diameter of wheels 110 facilitates singulation in that the wheels 110 rotate freely and wheels 110 of adjacent chain attachment assemblies 50 define a distinct conveying pocket.

The weighing cradle 103 and discharge plate 104 disposed between adjacent roller assemblies 100 do not participate in supporting articles of produce 12, either during singulation, normal transport, or rotation of the produce 12. Rather, the weighing cradle 103 and discharge plate 104 are disposed in a retracted, resting position which subtends the produce 12 during singulation, normal transport, or rotation of the produce 12. A contrary arrangement would impair efficient rotation for purposes of optical scanning, as well as impairing singulation by providing a non-rotatable surface upon which produce 12 could be stably supported to serve as a base upon which to stack additional produce 12 in a non-singulated manner. Each article of produce 12 transported through mechanical sorter 10 thus bridges adjacent roller assemblies 100 on the top surface of sorter chain 40.

Both the singulation and the support of produce 12 along the conveying path is accomplished by adjacent pairs of roller assemblies 100 rotatably mounted in roller mounts 102, which are in turn releasably secured by previously disclosed means to sorter chain 40. For this reason, each roller assembly 100 in combination with the roller mount 102 in which it is supported will be referred to hereafter as a singulating support assembly. As seen to best advantage in FIG. 4, each singulating support assembly attached to sorter chain 40 cooperates with the singulating support assembly adjacent thereto to both isolate individual articles of produce 12 from each other and to support those individual articles of produce 12 during transport through mechanical sorter 10.

An additional feature of the type of support afforded to individual articles of produce 12 by adjacent singulating support assemblies is that produce 12 thus supported may be rotated selectively to afford access to additional portions of the surface thereof for optical scanning purposes. This is accomplished by rotating the two roller assemblies 100 upon which a given article of produce 12 is supported and transported throughout mechanical sorter 10. As produce 12 rests exclusively on two such adjacent roller assemblies 100, produce 12 will rotate therewith, but in an opposite direction therefrom. Were produce 12 supported between adjacent roller assemblies 100 to rest on the weighing cradle 103 and/or the discharge plate 104 therebetween, this process would be impeded. The capacity to rotate singulated articles of produce 12 on sorter chain 40 is utilized advantageously in mechanical sorter 10 at scanning station 64.

Figure 6:
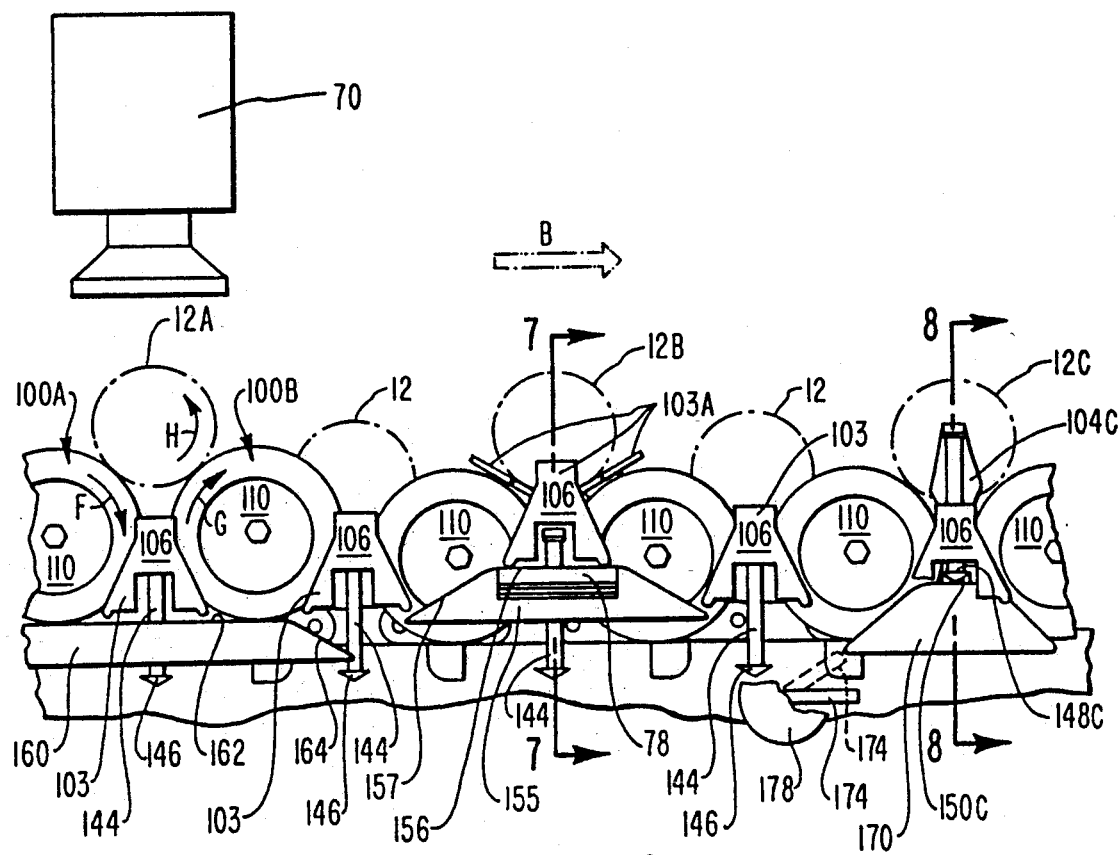
FIG. 6 is a detailed elevation view of the sorter apparatus of FIG. 1 illustrating one object being rotated, one object held by a weighing cradle passing over a load cell for weight measurement, and another object at the output station thereof illustrating the operation of the activation means of the present invention causing the object to off-load.

Thus, in accordance with the present invention, rotation control means are provided for interacting with the wheels 110 of roller assemblies 100 to rotate produce 12 supported thereupon. As shown in FIG. 6 by way of illustration, and not limitation, within the viewing ranges of optical scanning devices, such as optical scanning device 70 along the conveying path of mechanical sorter 10 is a stationary ramp 160 the upper face of which defines a roller rotation surface 162. Ramp 160 is so positioned adjacent the conveying path of mechanical sorter 10 as to contact the outermost circumferential portion of wheels 110 as movement of sorter chain 40 draws the singulating support assemblies through scanning station 64. The extreme ends of roller rotation surface 162 may be beveled at 164 to facilitate the smooth passage of roller assemblies 100 onto and off of roller rotation surface 162.

In FIG. 6, roller assemblies 100A and 100B, rotatably supporting article of produce 12A therebetween are in engagement with ramp 160. Sorter chain 40 and its contents are moving in the direction shown in arrow B. During the engagement of ramp 160 by roller assemblies 100A and 100B, article of produce 12A is scanned by optical scanning device 70. The passage of roller assemblies 100A and 100B over ramp 160 produces rotation therein in the direction indicated by arrows F and G, respectively. This in turn produces rotation in the direction indicated by arrow H of article of produce 12A rotatably supported between roller assemblies 100A and 100B. Once movement of sorter chain 40 in the direction indicated by arrow B draws roller assemblies 100A and 100B past contact with ramp 160, the rotation indicated by arrows F and G and, correspondingly the rotation of article of produce 12A shown by arrow H, terminates.

While roller rotation surface 162 is depicted in FIG. 6 as fixed relative to the conveying path of mechanical sorter 10, an equally workable alternative rotation control means could comprise a roller rotation surface which is itself moveable, such as a rotatably-driven belt located adjacent the conveying path of mechanical sorter 10 in the position of ramp 160. The direction and speed of such a belt would determine the extent of rotation imparted to passing produce 12, supported on roller assemblies 100A and 100B.

In addition, the location of ramp 160 should be variable to permit rotation of produce 12 to occur at any desired location of scanning station 64. Further, the length of roller rotation surface 162 may be adjusted to effect different degrees of rotation in passing produce 12. One way in which this can be accomplished is through the provision of several interchangeable ramps 160 of various length. Thus, an article of produce 12 could be rotated twice by 120° on ramps 160 of a first length. If scanned prior and subsequent to, as well as between, the two rotations, the produce 12 will be completely examined by the scanning means of scanning station 64. In the alternative, using shorter ramps 160, produce 12 could be rotated three times by only 90°, and yet could be equally thoroughly examined, if scanned before and after the series of three rotations and between each.

In the context of the present invention, it is useful to define as a conveying pocket for each singulated article of produce 12 the space between adjacent roller assemblies 100 on sorter chain 40. Each such conveying pocket thus rotatably supports an individual article of produce 12 along the conveying path of mechanical sorter 10. Importantly, the center portion of each conveying pocket of the present invention provides no support whatsoever to the produce 12 rotatably carried therein. Instead, each article of produce 12 is entirely supported at the sides of the conveying pocket by rotatable roller assemblies 100. Hence, the larger the diameter of wheels 110, the deeper the conveying pocket created thereby. A deeper conveying pocket accommodates and handles larger articles of produce 12 more readily than a shallow conveying pocket.

The weighing cradle 103 and discharge plate 104 between roller assemblies 100 of the conveying pocket are below the produce 12 supported therebetween and do not participate in its support. The conveying pocket of the present invention does, however, interact with the rotation control means at scanning station 64 to rotate the produce 12 supported in the conveying pocket to any desirable extent.

Figure 7:
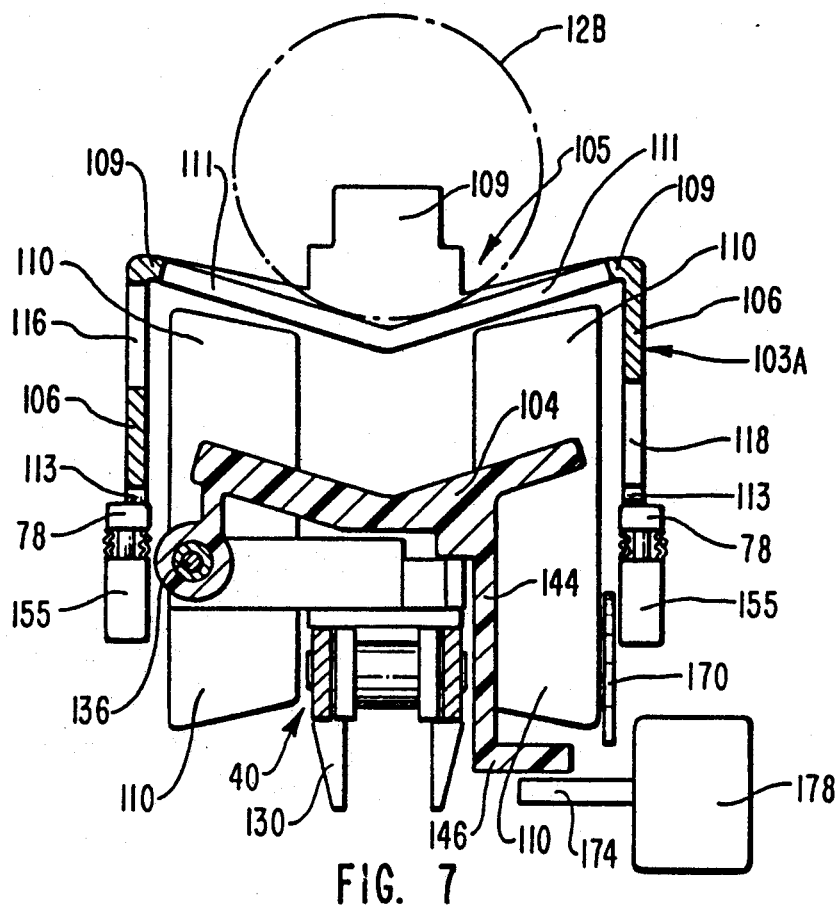
FIG. 7 is a cross-sectional elevation view of the sorter apparatus of FIG. 1 taken along section line 7—7 of FIG. 6 showing an object at a weight station.

Turning now to FIGS. 6 and 7, the weighing function of the present invention will be discussed. As chain attachment assemblies 50 are conveyed through the weighing station 66, each weighing cradle 103 is drawn across the load cell 78 and is weighed, along with the contents of the weighing cradle 103, if any. In FIG. 6, an example of an article of produce 12 being weighed is depicted. The side legs 106 of each weighing cradle 103 encounter a stationary load cell ramp 155, the upper surface of which defines a cradle sliding surface 156. Load cell ramps 155 are disposed on both sides and adjacent to the conveying path of mechanical sorter 10 to contact the lowermost leading edge of each side leg 106 as movement of the sorter chain 40 draws the weighing cradles 103 through the weighing station 66. The extreme ends of the load cell ramp 155 are bevelled at 157 to facilitate the smooth passage of side legs 106 onto and off of the cradle sliding surface 156.

In FIG. 6, weighing cradle 103A supporting article of produce 12B is in engagement with load cell ramp 155. Sorter chain 40 and its contents are moving in the direction of arrow B. Prior to engagement of ramp 155 by weighing cradle 103, each article of produce 12 is supported in the conveying pocket only by adjacent roller assemblies 100. The weighing cradle 103 provides no support to the articles of produce 12. The passage of weighing cradle 103A over ramp 155 captures and elevates the article of produce 12B away from its support by roller assemblies 100 to be cradled in the concave saddle 105 of weighing cradle 103A. In this manner, the article of produce 12B is supported entirely by weighing cradle 103A as it passes over load cell 78. Once movement of sorter chain 40 in the direction of arrow B draws the weighing cradle 103A past contact with load cell ramp 155, the elevation of weighing cradle 103A ceases and the article of produce 12B is released and once again supported only by roller assemblies 100.

Since the article of produce 12B prior to encountering weighing station 66 has been singulated and rotated for optical scanning, it rests stably in the conveying pocket. Hence, as the Weighing cradle 103A encounters load cell ramp 155 and is elevated, the article of produce 12B is captured with minimum jostling and the article of produce 12B rests stably in the concave saddle 105. This tends to centralize the center of gravity of the article of produce 12B, whether it is large or asymmetrical, so that accuracy of the weight measurement is maximized.

Guide nubs 113 and the corners of the side legs 106 that encounter load cell ramps 155 are rounded to facilitate the smooth sliding of the weighing cradle 103 onto and over the load cell ramp 155. The guide nubs 113 also provide definitive points of support where accurate measurement by the load cell 78 can be performed. Additionally, since discharge slot 111 is centrally located in the concave saddle 105 of each weighing cradle 103, it provides an opening through which excess moisture can fall. Such moisture would otherwise effect the accuracy of the weight measurement.

Further, because the weight of each weighing cradle 103 is measurable and constant, the computer 76 can readily determine the weight of the article of produce 12B positioned within the concave saddle 105, if there is one so positioned, from the weight measurement taken at the load cell 78. The weight of the article of produce 12B is considered along with other criteria to determine the grouping to which article of produce 12B should be placed.

The discharge function of chain attachment assemblies 50 will now be discussed generally, first in relation to FIG. 6. There it can readily be appreciated that an upward force exerted on foot 146 of discharge plate 104C will cause discharge plate 104C to be lifted up from its resting disposition and rotated about pivot pin 136. In the process, discharge plate 104C will initially encounter the lower surface of any object, such as article of produce 12C, being carried within the conveying pocket above discharge plate 104C. Further movement of discharge plate 104C in the same direction will both lift produce 12C upwardly from its support on the roller assemblies 100 on either side of discharge plate 104C and tilt produce 12C in the direction of arrow E (See FIG. 8). Ultimately, this combination of lifting and tilting applied to article of produce 12C will result in article of produce 12C being off-loaded from sorter chain 40 in the direction of arrow E.

Thus, in accordance with the present invention, activation means are provided for tilting selected individual ones of the discharge plates 104 upward in order to unload objects supported in the conveying pocket from the sorter chain 40. As shown by way of example, and not limitation, in FIG. 6 at each discharge location in output station 62, mechanical sorter 10 is provided with activation ramps, such as activation ramp 170, positioned adjacent the conveying path. A corresponding diverter arm 174 is located at the lead end of activation ramp 170. Each discharge plate 104 being drawn through output station 62 in the direction indicated by arrow B in FIG. 6 thus initially passes diverter arm 174 and then the activation ramp 170.

Activation ramp 170 is positioned to be capable of interacting with the orientation control surface 150 of each discharge plate 104 when sorter chain 40 moves chain attachment assemblies 50 through the output station 62. In the resulting interaction, the selected individual orientation control surface 150 is raised by its passage over the activating ramp 170. Correspondingly, the discharge plate 104 attached thereto is tilted about the pivot pin 136 on which it is mounted. Whether or not a given orientation control surface 150 interacts with activation ramp 170 is determined by the position of the diverter arm 174. Each diverter arm 174 is independently controlled according to information about articles of produce 12 obtained at scanning station 64 and/or weighing station 66 The diverter arm 174 may be controlled, for example, by a solenoid 178. It should be understood, however, that any alternative means for controlling the orientation of a diverter arm 174 is equally acceptable according to the principles of the present invention.

Each diverter arm 174 has an activated position and a nonactivated position In FIG. 6, diverter arm 174 is shown in its nonactivated position As can be appreciated by reference to FIGS. 6 and 7 in combination, in the nonactivated position of diverter arm 174, a passing orientation control surface 150 will travel above diverter arm 174. Discharge plate 104 attached thereto will remain in its substantially horizontal position. Activation ramp 170 is configured and positioned so that the orientation control surfaces 150 of passing discharge plates 104 will not normally interact therewith.

In contrast, at discharge locations in output station 62 where the diverter arm 174 is moved into its activated position, objects are discharged. As seen in phantom lines in FIGS. 6 and 8, diverter arm 174 has been rotated into its activated position by solenoid 178. In that position, the top surface of diverter arm 174 slopes upwardly in alignment with the lead surface of activation ramp 170. Diverter arm 174 was moved into such a position because the next article of produce 12C on sorter chain 40 has characteristics detected in scanning station 64 and/or weighing station which warrant its removal at the discharge location corresponding to diverter arm 174. When a diverter arm 174 is in the activated position, the orientation control surface 150C is directed onto and over the activation ramp 170.

Figure 8:
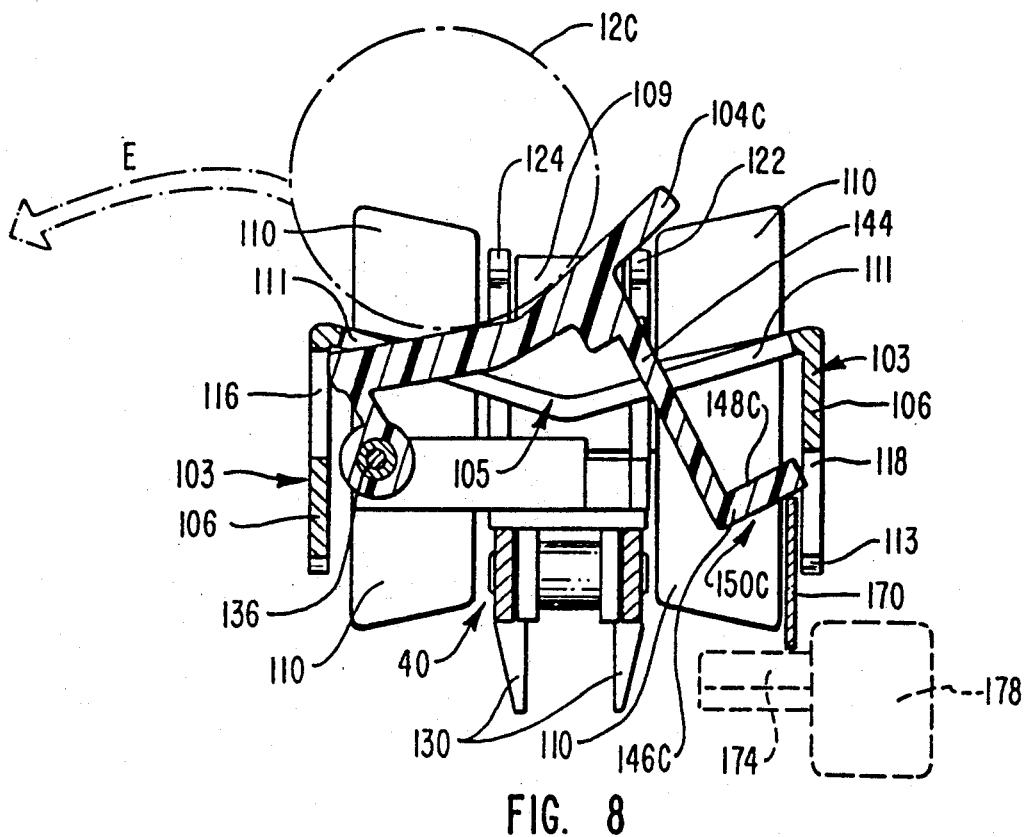
FIG. 8 is a cross-sectional elevation view of the sorter apparatus of FIG. 1 taken along section line 8—8 of FIG. 6 showing an object being off-loaded from the conveyor chain.

For example, as best seen by reference to FIGS. 6 and 8 taken together, movement of discharge plate 104C in the direction indicated by arrow B has resulted in orientation control surface 150C encountering the upper surface of diverter arm 174 causing orientation control surface 150C to ride upwardly along the upper surface toward and eventually onto the bevelled lead surface of activation ramp 170. Corresponding foot 146C and discharge plate 104C is tilted upwardly and article of produce 12C carried in the conveying pocket is being unloaded from sorter chain 40 in the direction of arrow E.

Importantly, in the mechanics of the discharge process, it is the center portion, rather than the sides of the conveying pocket that is lifted. The unloading movement imparted to the article of produce 12 is thus applied to the center thereof. Accordingly, in the method and apparatus of the present invention, the discharge of a single article of produce 12 involves no application of unloading forces that are not centered or simultaneous, as occurs in known sorters in which objects or articles transported are supported at the center of each conveying pocket, but discharged by lifting the outer edges thereof. Further, the discharge of a single article of produce 12 does not involve a large transverse force which would eject the produce 12 with a striking motion that can bruise or otherwise damage the produce 12. Therefore, in unloading produce 12 by the method or apparatus of the present invention, little or no momentum is imparted thereto which is parallel to the conveying path. Accordingly, each article of produce 12 removed from sorter chain 40 is discharged in a controlled manner.

Further, in order to discharge a specific article of produce 12, movement of only a single corresponding part attached to sorter chain 40 is required. Thus, once the single discharge plate 104 associated with an article of produce 12 to be unloaded has passed the diverter arm 174 at the discharge location where unloading is to occur, that discharge arm 174 can be lowered from its activated to its nonactivated position. The diverter arm 174 involved need not remain in its activated position for more than a brief instant while the discharge plate 104 passes by. There is no need, as in known sorters, for the diverter arm 174 to remain in the activated position while two movable parts associated with each article to be discharged are drawn by. This significantly reduces the timing difficulties involved in producing proper functioning.

Finally, according to the present invention, in the process of removing produce 12 from any given conveying pocket of sorter 110, produce 12 being transported in adjacent carrying pockets is not disturbed. As best seen by reference to FIG. 6, articles of produce 12 in carrying pockets adjacent to discharge plate 104C are not disturbed by the mechanical motions of discharge plate 104C required to unload the article of produce 12C. Thus, the stability of adjacent articles of produce 12 is preserved, to substantial advantage when compared with known discharge methods and apparatus.

Accordingly, in the method and apparatus of the present invention, it is possible to fully utilize each adjacent conveying pocket of the sorter chain 40 involved, thereby efficiently utilizing the length thereof and contributing to the speed by which objects or articles or produce 12 may be handled. The present invention thus involves a highly advantageous method and apparatus for discharging objects or articles of produce 12 processed by a mechanical sorter 10. The precision and mechanical ease of discharging those objects or articles of produce 12 is improved, while at the same time the objects or articles of produce 12 transported substantially adjacent to one another are not destabilized by the discharge of an object or article of produce 12 being carried immediately adjacent thereto.

The realization of these capabilities requires a plurality of only a few simple components attached directly or indirectly to the sorter chain 40. This arrangement further singulates the objects or article of produce 12 being handled and supports them rotatably during their transport by the apparatus, thus enabling enhanced access to the surfaces thereof for scanning purposes. This same arrangement also accurately weighs each individual article of produce 12.

Thus, all processing that occurs in mechanical sorter 10 in relation to a single given article of produce 12 is implemented by an object handling unit disposed on a single conveyor comprising two successive roller assemblies 100 that support the articles of produce 12, a weighing cradle 1103 disposed below the article of produce 12, and a discharge plate 104 pivotally mounted between the roller assemblies 100, but below the article of produce 12 supported thereby. Each such object handling unit is capable of singulating articles of produce 12 in input section 60 and thereafter rotatably transporting individual ones thereof along the conveying path of mechanical sorter 10.

At scanning station 64, the object handling unit, and in particular the wheels 110 of roller assemblies 100 thereof, interact with the rotation control means of the present invention to rotate the article of produce 12 being transported in the object handling unit by any desired amount for scanning purposes. At weighing station 66, the object handling unit, and in particular the weighing cradle 103, interacts with weight measurement means of the present invention to elevate the article of produce 12 onto the load cell 78 so it can be weighed.

Based on information derived during scanning and/or weighing of the article of produce 12, the discharge plate 104 of the object handling unit is thereafter lifted by its interaction with an activation means of the present invention located at the discharge location appropriate to the given article of produce 12, and that article of produce 12 is unloaded from sorter chain 40 onto a suitable collection means for grouping in accordance with the predetermined sorting criteria.

As chain attachment assemblies 50 travel around sprocket wheel 34 in the direction indicated by arrow A, discharge plates 104 under the influence of gravity tilt downwardly from their normal horizontal resting position. Thus, discharge plates 104 will hang downwardly as they travel along the lower portion of sorter chain 40 returning toward sprocket wheel 36. Unless discharge plates 104 are thereafter properly repositioned in the substantial horizontal resting positions, the plurality of chain attachment assemblies 50 will be unable to properly receive and singulate produce 12 in input section 60. In order to eliminate this potential difficulty, a curved reset bar 192 is positioned adjacent the lower section of sorter chain 40 directly below sprocket wheel 36. Thus, as chain attachment assemblies 50 travel upward below sprocket wheel 36, reset bar 192 pushes discharge plates 104 into the substantially horizontal position thereof that is appropriate to receiving produce 12 from feed mechanism 68.

To facilitate the rapid handling of a large volume of produce 12, several mechanical sorters 10 may be positioned in parallel adjacent one another to form a large-capacity optical sorting and weighing system. In such a case, feed mechanism 68 would be appropriately widened in order to supply articles of produce 12 to each of the conveyors of the system. In addition, the belts of a collection conveyor, such as collection conveyor 80, would be extended beneath all of the sorter chains of the system to collect sorted articles of produce 12 discharged from each sorter chain 40. In some instances, a single scanning device 70 or multiple devices could be used to scan the articles of produce 12 on several adjacent sorter chains of the system.

Figure 11:
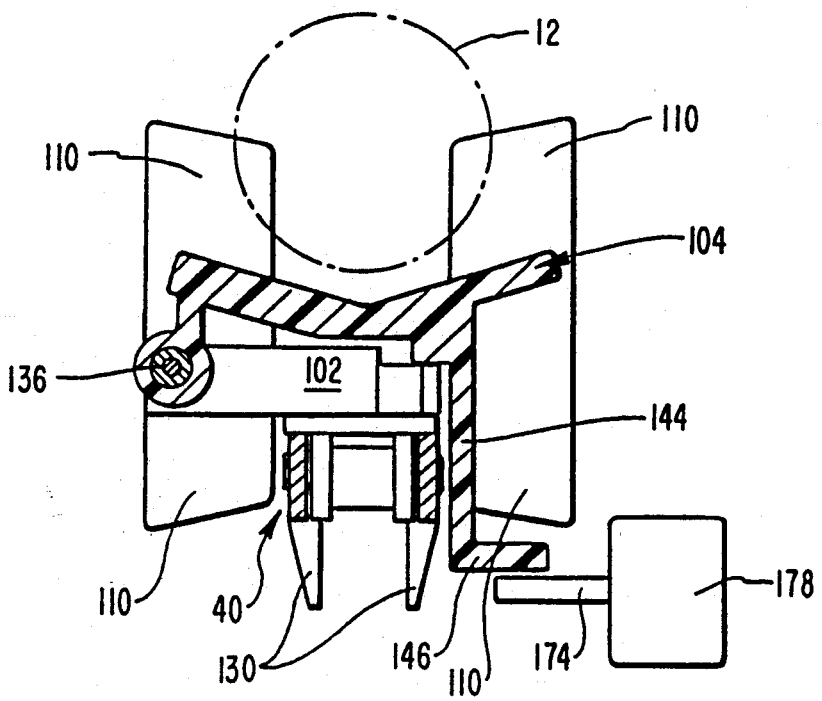
FIG. 11 is a cross-sectional elevation of an object handling unit of the alternative embodiment shown in FIG. 10 taken along section line 11—11.

FIGS. 9-11 depict the components of an alternative embodiment of a chain attachment assembly 50A incorporating teachings of the present invention for use in an apparatus such as mechanical sorter 10. In the discussion of chain attachment assembly 50A, to the extent possible, the same reference numerals will be utilized to identify components which are identical in structure and function to those found in chain attachment assembly 50 shown in FIG. 2. Thus, chain attachment assembly 50A comprises a roller assembly 100, a roller mount 102, and a discharge plate 104 as described previously, but does not have a weighing cradle 103.

The roller assembly 100 comprises an axle 108 and a pair of wheels 110 each having a frusto-conical periphery oriented such that the larger end of each is more remote from the longitudinal center of chain 40 than the smaller end of each. Each roller assembly 100 is configured with the wheels 110 disposed in spaced relation to each other so that axle 108 is utilized to rotatably mount each roller assembly 100 in a corresponding roller mount 102.

Each roller mount 102 is attached to sorter chain 40 in a manner as described above using resilient legs 128 and hooks 130, and has a planar floor portion 120 from which two upwardly turned, parallel side plates 122 and 124 extend. The side plates 122 and 124 each have an elongate axle slot 126 formed centrally therein for receiving axle 100 in vertically slidable and rotatable support engagement. The discharge plate 104 is pivotally supported on pivot pin 136 of roller mount 102 in a substantially horizontal resting position between roller assemblies 100 of adjacent pairs of chain attachment assemblies 50A. Correspondingly, discharge plate 104 is provided with a pivot pin bore 138 for receiving the pivot pin 136 enabling discharge plate 104 to rotate about pivot pin 136. Depending from discharge plate 104 at the end thereof opposite from pivot pin bore 138 is finger 144. Extending normal to finger 144 at the remote end thereof is foot 146 which projects outwardly from the sorter chain 40. Foot 146 has a generally horizontal upper surface 148 and an orientation control surface 150. Orientation control surface 150 comprises two upwardly inclined faces 152 and 154, so that foot 146 has a generally triangular cross-section. Orientation control surface 150 is used in the same manner as described above to tilt discharge plate 104 upwardly about pivot pin 136 from its resting position.

Alternative embodiment chain attachment assembly 50A operates in the same manner as previously described chain attachment assembly 50 operates, with the single exception that the mechanical sorter 10 using a chain attachment assembly 50A does not have a weighing station and the articles of produce 12 are not weighed during conveyance. Consequently, chain attachment assembly 50A does not require a weighing cradle. Nevertheless, with presently known computer hardware and software, and scanning techniques for detecting size, quite accurate weight estimates can be made without weighing each article of produce 12.

It should also be understood that another alternative embodiment of the present invention may comprise a mechanical sorter 10 which utilizes alternative chain attachment assemblies 50A and a few (one or more) chain attachment assemblies 50 and a weighing station. With this configuration, only periodically is an article of produce 12 weighed. This weighing can then be compared by computer 76 with the size information for the same article of produce 12 to determine the accuracy of the weight estimate based on the size information and whether or not an adjustment needs to be made in the processing used to determine weight from size information. Periodically, the computer 76 then could make whatever adjustments are warranted.

Figure 12:
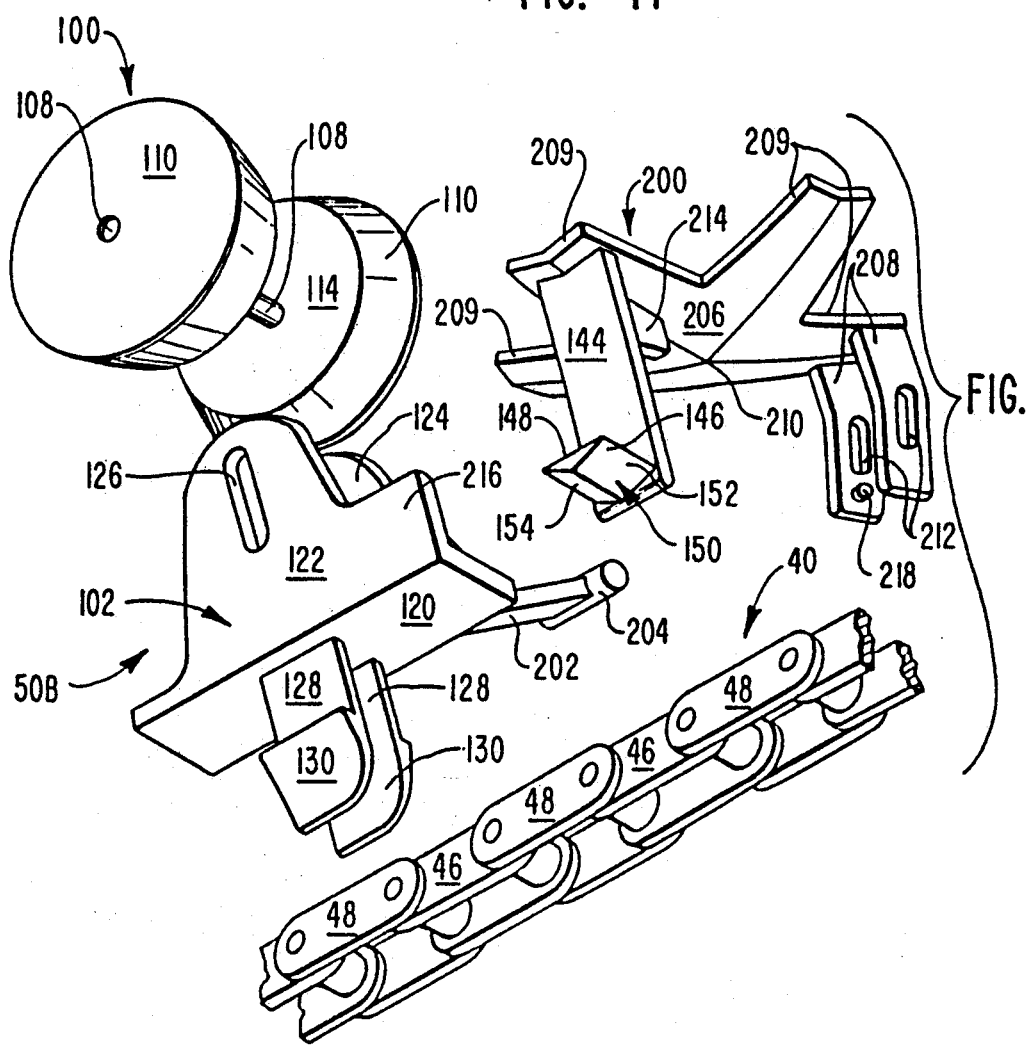
FIG. 12 is an exploded perspective view of another alternative embodiment of the sorter chain of the present invention and the components of a chain attachment assembly.
Figure 13:
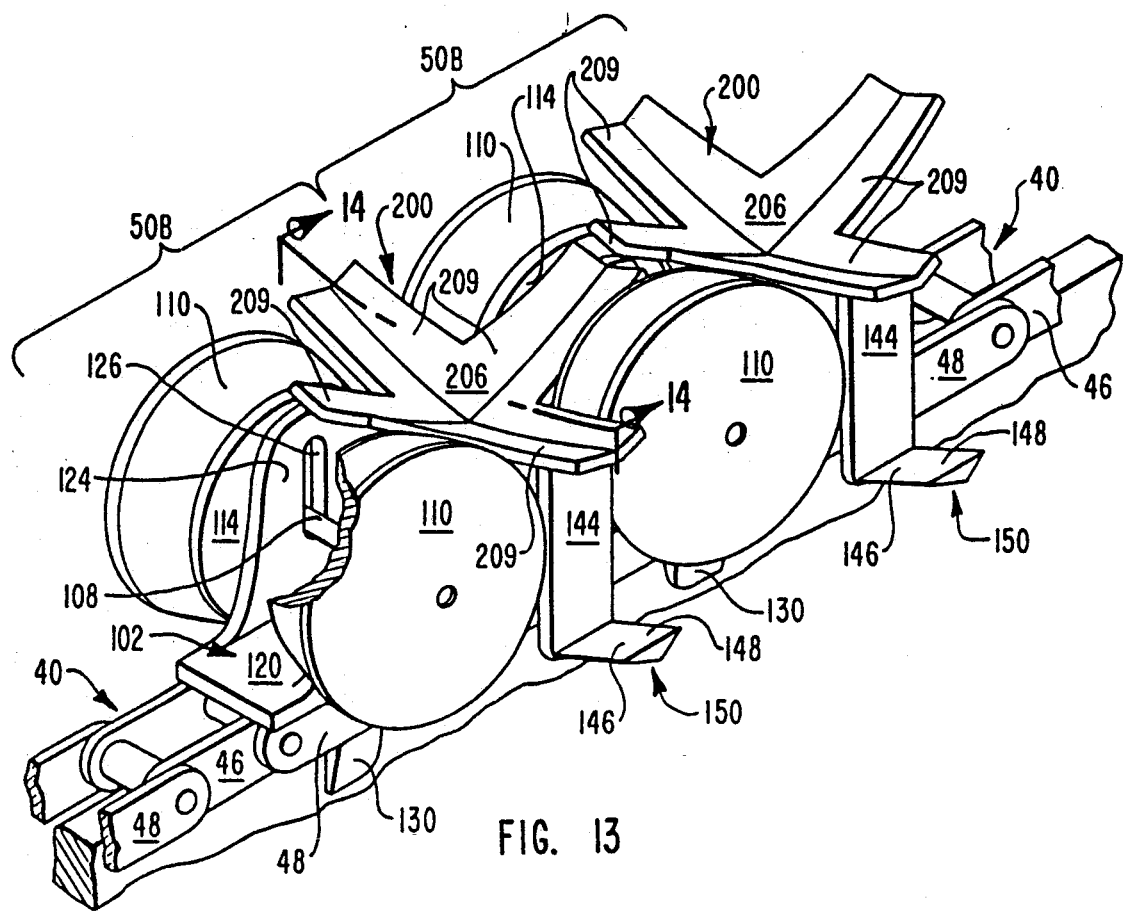
FIG. 13 is a detailed perspective view of an adjacent pair of chain attachment assemblies according to the alternative embodiment shown in FIG. 12.

Turning now to FIGS. 12-15, another alternative embodiment of the present invention is illustrated in which an alternative chain attachment assembly 50B is capable of performing the functions of singulation, rotation for scanning, elevation for weighing, and discharge of articles of produce 12. Again, like reference numbers will be used for like components to the extent possible. As shown in FIG. 12, the alternative chain attachment assembly 50B comprises a roller assembly 100, a slightly modified roller mount 102, and a discharge saddle generally designated at 200.

The roller assembly 100 comprises an axle 108 and a pair of wheels 110 each having a frusto-conical periphery oriented such that the larger end of each is more remote from the longitudinal center of chain 40 than the smaller end of each. Each roller assembly 100 is configured with the wheels 110 disposed in spaced relation to each other so that axle 108 is utilized to rotatably mount each roller assembly 100 in a corresponding roller mount 102.

Each roller mount 102, although slightly modified in configuration, is attached to sorter chain 40 in a manner as described above using resilient legs 128 and hooks 130, and has a planar floor portion 120 from which two upwardly turned, parallel side plates 122 and 124 extend. The side plates 122 and 124 each have an elongate axle slot 126 formed centrally therein for receiving axle 100 in vertically slidable and rotatable support engagement. The roller mount 102 also comprises an extension 202 with a pintle 204 disposed at the distal end of the extension 202.

The most significant difference between alternative chain attachment assembly 50B and the previously described chain attachment assemblies 50 and 50A lies in the means used for weighing and discharging an article of produce 12. The discharge saddle 200 of this alternative preferred embodiment performs a dual function in that it is integral to the operations of weighing and discharging an article of produce 12. The discharge saddle 200 comprises saddle 206, a pair of depending members 208, and depending finger 144 and foot 146.

The upper surface of saddle 206 is configured similar to that of the upper surface of the weighing cradle 103 previously described herein and comprises four upwardly turned concave wings 209 extending from a central point 210. Similar to weighing cradle 103, the purpose of the concave, star-like configuration of saddle 206 is to cradle an article of produce 12 when the discharge saddle 200 is elevated for weighing the produce 12.

Figure 14:
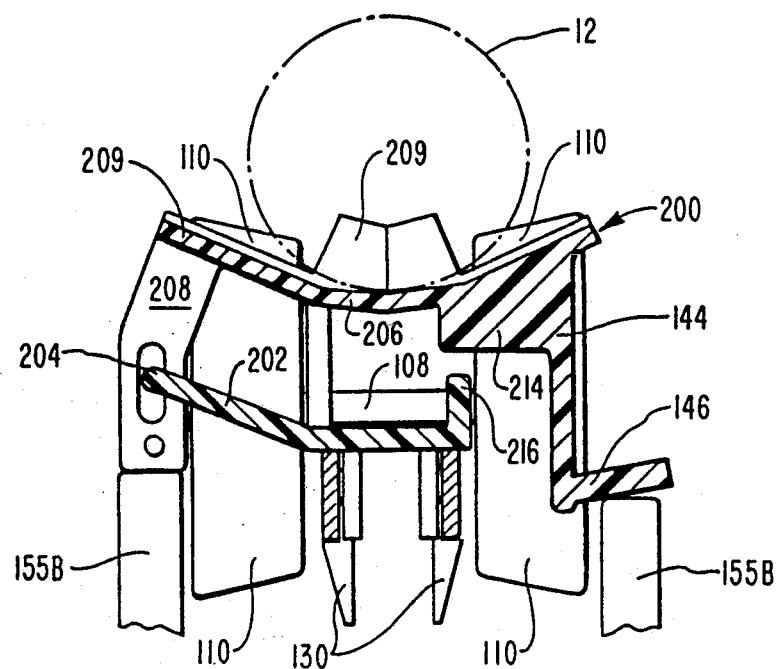
FIG. 14 is a cross-sectional elevation of an object handling unit of the alternative embodiment shown in FIG. 13 taken along section line 14—14.
Figure 15:
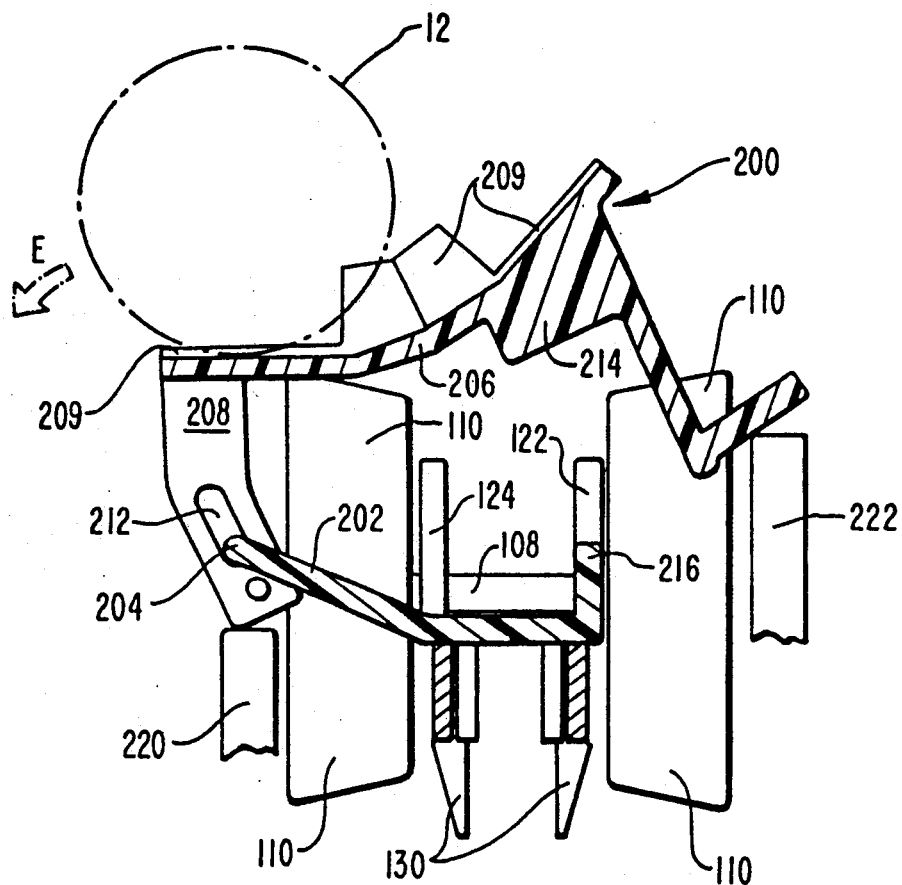
FIG. 15 is a cross-sectional elevation view of the sorter apparatus of FIG. 14 showing any object being off-loaded.

Depending from one wing 209 are members 208 disposed in register and parallel to each other and each of which having an elongated slot 212 for receiving the pintle 20 in vertically slidable and pivotally rotatable engagement. As best seen in FIGS. 14 and 15 in combination, the length of the slot 212 corresponds to the functions of the discharge saddle 200. Pintle 204 rests in the uppermost portion of the slot 212 when the discharge saddle is in its resting position and web 214 rests on support 216. In this resting or inactive position, saddle 206 is disposed below and provides no support for any article of produce 12 being transported within the conveying pocket defined by the adjacent roller assemblies 100 (See FIG. 13). Also, when in the resting position, the discharge saddle will not interfere with the rotation of the produce 12 for scanning purposes. When elevated for weighing purposes, pintle 204 slides freely vertically so that an accurate weight measurement can be taken. As shown in FIG. 15, the pintle 204 is disposed in the lowermost portion of slot 212 when the discharge saddle 200 is further elevated to enable the discharge saddle 200 to rotate on pintle 204 during discharge of an article of produce 12 from the sorter chain 40. At least one of the members 208 has a stop 218 which restricts the degree of rotation of the discharge saddle 200 during off-loading and during the return of the sorter chain 40 to the input station 60 of mechanical sorter 10.

Depending from discharge saddle 200 at the end thereof opposite from members 208 is finger 144. Extending normal to finger 144 at the remote end thereof is foot 146 which projects outwardly from the sorter chain 40. Foot 146 has a generally horizontal upper surface 148 and an orientation control surface 150. Orientation control surface 150 comprises two upwardly inclined faces 152 and 154, so that foot 146 has a generally triangular cross-section. Orientation control surface 150 is used in the same manner as described above to tilt discharge saddle 200 upwardly about pintle 204 as shown in FIG. 15.

In operation, the discharge saddle 200 acts similar to the weighing cradle 103 as the chain attachment assembly 50B is drawn into weighing station 66. Foot 146 and the bottom of members 208 encounter load cell ramps 155B similar to load cell ramp 155 which elevate the discharge saddle 200 for engagement with a load cell 78. A weight measurement is taken as the discharge saddle 200 passes over the load cell 78. The weight information is then used to determine, along with other sorting criteria, the discharge location for an article of produce 12 corresponding to the weight measurement.

In order for the discharge saddle 200 to off-load an article of produce 12 a pivot ramp 220 must elevate the discharge saddle 200 to its pivoting position as shown in FIG. 15. Both sides of the discharge saddle 200 are elevated simultaneously in a manner similar to elevation for weighing, except that the elevation is for the full extent permitted by slot 212. When so elevated, pintle 204 is then in position to permit the rotation of the discharge saddle 200 for off-loading. The discharge rotation is effected by an actuation means similar to that used with discharge plate 104 such as a ramp 222 which is encountered only if it is determined that the article of produce 12 meets the sorting criteria warranting discharge from the conveying pocket in the direction of arrow E.

In summary, a method for sorting objects or articles of produce 12 in accordance with a predetermined sorting criteria has been disclosed in which individual of the objects or articles of produce 12 are rotatably supported between adjacent pairs of a sequence of roller assemblies 100 above selectively elevated weighing cradles 103 and tiltable discharge plates 104. The sequence of roller assemblies 100 bearing articles of produce 12 are thereafter moved past a roller rotation surface 162 capable of interacting with roller assemblies 100 to rotate produce 12 supported thereon. Produce 12 is scanned by suitable scanning means to detect the presence of the predetermined sorting criteria. The produce 12 is drawn through weighing station 66 where it is captured and supported by elevating the weighing cradle 103 to pass over a load cell 78 to afford the taking of a weight measurement of the produce 12. Finally, the sequence of roller assemblies 100 with produce 12 supported therebetween is advanced past an activation means. Responsive to the scanning and/or weighing means, the activation means selectively tilts individual ones of the discharge plates 104 upward to unload corresponding produce 12 from between adjacent pairs of roller assemblies 100.

While mechanical sorter 10 has particular applicability to sorting objects, such as articles of produce 12, it should be understood that the teachings of the present invention find ready applicability to sorters of objects of all types.

The invention may be embodied in other specific forms without departing from its spirit or essential characteristics. The described embodiments are to be considered in all respects only as illustrative and not restrictive The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for handling objects comprising:
   conveying means for rotatably supporting and transporting the objects along a conveying path from an object input station to an object output station, comprising a frame, a chain movably suspended from said frame along said conveying path, said chain comprising a plurality of links connected to form an endless loop, and a plurality of chain attachment assemblies releasably secured to said chain and adjacent pairs of chain attachment assemblies defining individual conveying pockets, said chain attachment assemblies comprising:
   a mount connected to said chain;
   a roller assembly connected to said mount in rotatable engagement;
   a cradle connected to said mount in vertically slidable engagement; and
   a discharge member connected pivotally to said mount;
   rotation control means adjacent said path of travel of said conveying means for interacting with said conveying means to rotate the objects supported thereon;
   weighing means for interacting with said conveying means to weigh each object;
   activation means for selectively interacting with each discharge member for off-loading individual ones of the objects to remove selected objects from said conveying means; and
   collection means located at said object output station for receiving the selected objects off-loaded from said conveying means.

2. An apparatus for handling objects as set forth in claim 1, wherein said cradle and discharge member are disposed in a retracted, subtending spaced relationship to the object within a conveying pocket unless being acted upon by said weighing means or said activation means.

3. An apparatus for handling objects as set forth in claim 1, wherein said chain attachment assemblies are disposed on said chain such that successive of said objects being transported by said conveying means are substantially adjacent to one another.

4. An apparatus for handling objects as set forth in claim 1, wherein said mount further comprises fastening means which releasably secures said mount to an individual link of said chain.

5. An apparatus for handling objects as set forth in claim 1, wherein said roller assembly comprises:
   an axle in mechanical communication with said mount such that said axle may rotate freely about its longitudinal axis; and
   a pair of wheels each having a frusto-conical periphery disposed on and connected to opposite ends of said axle in spaced relationship to each other and oriented such that the larger diameter periphery of each wheel is adjacent one of the ends of the axle.

6. An apparatus for handling objects as set forth in claim 5, wherein said rotation control means comprises a roller rotation surface disposed adjacent said conveying path for engaging said wheels and imparting controlled rotation to said wheels, thereby imparting rotation to the object being supported thereon.

7. An apparatus for handling objects as set forth in claim 6, wherein said roller rotation surface has a predetermined length thereby imparting a predetermined degree of rotation to the object supported on said wheels.

8. An apparatus for handling objects as set forth in claim 1, wherein said weighing means comprises a ramp and a load cell disposed adjacent said conveying path, said ramp for engaging said cradle and elevating said cradle such that the object within a conveying pocket is captured thereon and elevated from the support of said roller assemblies and directing said cradle to engagement with said load cell, said load cell for ascertaining the weight of the object captured by said cradle.

9. An apparatus for handling objects as set forth in claim 1, wherein said cradle is removable from said conveying means.

10. An apparatus for handling objects as set forth in claim 1, wherein said cradle has a slot therein having a profile slightly larger than the upper portion of said discharge member through which said discharge member passes free from contact with said cradle if said discharge member is acted upon by said activation means to selectively off-load one of the objects.

11. An apparatus for handling objects as set forth in claim 1, wherein said cradle has a peripheral configuration that generally conforms to the contour of the roller assemblies and occupies the space between said roller assemblies of adjacent pairs of chain attachment assemblies.

12. An apparatus for handling objects as set forth in claim 1, wherein said discharge member further comprises an orientation control surface for interaction with said activation means to pivot said discharge member and off-load onto said receiving means the object from the conveying pocket adjacent said discharge member.

13. An apparatus for handling objects as set forth in claim 12, wherein said activation means comprises a ramp and a selectively operable diverter arm each disposed adjacent the conveying path, said diverter arm having an activated position in which selected individual ones of said orientation control surfaces are directed into interaction with said ramp and a non-activated position in which said orientation control surface avoids interaction with said diverter arm and said ramp, said ramp being interactable with selected individual ones of said orientation control surfaces to pivot selected discharge members to off-load objects.

14. An apparatus for handling objects as set forth in claim 13, wherein said diverter arm is operated by a solenoid.

15. An apparatus for handling objects as set forth in claim 12, wherein said orientation control surface is located on a finger projecting from said discharge member.

16. An apparatus for handling objects as set forth in claim 1, further comprising scanning means for scanning the surface of objects to ascertain characteristics of each object in transport along the conveying path.

17. An apparatus for handling objects as set forth in claim 16, wherein said scanning means is in communication with said activation means such that objects are off-loaded selectively in accordance with the characteristics of each object based on predetermined criteria.

18. An apparatus for handling objects as set forth in claim 16, wherein said scanning means comprises an optical scanning device.

19. An apparatus for handling objects as set forth in claim 16, wherein said scanning means comprises a solid state camera.

20. An apparatus for handling objects as set forth in claim 1, wherein said cradle and said discharge member are disposed between adjacent pairs of roller assemblies.

21. An apparatus for handling objects comprising:
conveying means for rotatably supporting and transporting the objects along a conveying path from an object input station to an object output station, comprising a frame, a chain movably suspended from said frame along said conveying path, said chain comprising a plurality of links connected to form an endless loop, and a plurality of chain attachment assemblies releasably secured to said chain and adjacent pairs of chain attachment assemblies defining individual conveying pockets, said chain attachment assemblies comprising:
a mount connected to said chain;
a roller assembly connected to said mount in vertically slidable and rotatable engagement;
a cradle connected to said mount in vertically slidable engagement; and
a discharge member connected pivotally to said mount;
rotation control means adjacent said path of travel of said conveying means for interacting with said conveying means to rotate the objects supported thereon;
weighing means for interacting with said conveying means to weigh each object;
activation means for selectively interacting with each discharge member for off-loading individual ones of the objects to remove selected objects from said conveying means; and
collection means located at said object output station for receiving the selected objects off-loaded from said conveying means.

22. An apparatus for handling objects as set forth in claim 21, wherein said cradle and discharge member are disposed in a retracted, subtending spaced relationship to the object within a conveying pocket unless being acted upon by said weighing means or said activation means.

23. An apparatus for handling objects as set forth in claim 21, wherein said chain attachment assemblies are disposed on said chain such that successive of said objects being transported by said conveying means are substantially adjacent to one another.

24. An apparatus for handling objects as set forth in claim 21, wherein said mount further comprises fastening means which releasably secures said mount to an individual link of said chain.

25. An apparatus for handling objects as set forth in claim 21, wherein said roller assembly comprises:
an axle in mechanical communication with said mount such that said axle may rotate freely about its longitudinal axis and may slide vertically; and
a pair of wheels each having a frusto-conical periphery disposed on and connected to opposite ends of said axle in spaced relationship to each other and oriented such that the larger diameter periphery of each wheel is adjacent one of the ends of the axle.

26. An apparatus for handling objects as set forth in claim 25, wherein said rotation control means comprises a roller rotation surface disposed adjacent said conveying path for engaging said wheels and imparting controlled rotation to said wheels, thereby imparting rotation to the object being supported thereon.

27. An apparatus for handling objects as set forth in claim 26, wherein said roller rotation surface has a predetermined length thereby imparting a predetermined degree of rotation to the object supported on said wheels.

28. An apparatus for handling objects as set forth in claim 21, wherein said weighing means comprises a ramp and a load cell disposed adjacent said conveying path, said ramp for engaging said cradle and elevating said cradle such that the object within a conveying pocket is captured thereon and elevated from the support of said roller assemblies and directing said cradle to engagement with said load cell, said load cell for ascertaining the weight of the object captured by said cradle.

29. An apparatus for handling objects as set forth in claim 21, wherein said cradle is removable from said conveying means.

30. An apparatus for handling objects as set forth in claim 21, wherein said cradle has a slot therein having a profile slightly larger than the upper portion of said discharge member through which said discharge member passes free from contact with said cradle if said discharge member is acted upon by said activation means to selectively off-load one of the objects.

31. An apparatus for handling objects as set forth in claim 21, wherein said cradle has a peripheral configuration that generally conforms to the contour of the roller assemblies and occupies the space between said roller assemblies of adjacent pairs of chain attachment assemblies.

32. An apparatus for handling objects as set forth in claim 21, wherein said discharge member further comprises an orientation control surface for interaction with said activation means to pivot said discharge member and off-load onto said receiving means the object from the conveying pocket adjacent said discharge member.

33. An apparatus for handling objects as set forth in claim 32, wherein said activation means comprises a ramp and a selectively operable diverter arm each disposed adjacent the conveying path, said diverter arm having an activated position in which selected individual ones of said orientation control surfaces are directed into interaction with said ramp and a non-activated position in which said orientation control surface avoids interaction with said diverter arm and said ramp, said ramp being interactable with selected individual ones of said orientation control surfaces to pivot selected discharge members to off-load objects.

34. An apparatus for handling objects as set forth in claim 32, wherein said orientation control surface is located on a finger projecting from said discharge member.

35. An apparatus for handling objects as set forth in claim 33, wherein said diverter arm is operated by a solenoid.

36. An apparatus for handling objects as set forth in claim 21, further comprising scanning means for scanning the surface of objects to ascertain characteristics of each object in transport along the conveying path.

37. An apparatus for handling objects as set forth in claim 36, wherein said scanning means is in communication with said activation means such that objects are off-loaded selectively in accordance with the characteristics of each object based on predetermined criteria.

38. An apparatus for handling objects as set forth in claim 36, wherein said scanning means comprises an optical scanning device.

39. An apparatus for handling objects as set forth in claim 36, wherein said scanning means comprises a solid state camera.

40. An apparatus for handling objects as set forth in claim 21, wherein said cradle and said discharge member are disposed between adjacent pairs of roller assemblies.

41. An apparatus for handling objects comprising:
conveying means for rotatably supporting and transporting the objects along a conveying path from an object input station to an object output station, comprising a frame, a chain movably suspended from said frame along said conveying path, said chain comprising a plurality of links connected to form an endless loop, and a plurality of chain attachment assemblies releasably secured to said chain and adjacent pairs of chain attachment assemblies defining individual conveying pockets, said chain attachment assemblies comprising:
a mount connected to said chain;
a roller assembly connected to said mount in rotatable engagement;
a discharge cradle connected to said mount in vertically slidable and pivotal engagement;
rotation control means adjacent said path of travel of said conveying means for interacting with said conveying means to rotate the objects supported thereon;
weighing means for interacting with said conveying means to weigh each object;
activation means for selectively interacting with each discharge cradle for off-loading individual ones of the objects to remove selected objects from said conveying means; and
collection means located at said object output station for receiving the selected objects off-loaded from said conveying means.

42. An apparatus for handling objects as set forth in claim 41, wherein said discharge cradle is disposed in a retracted, subtending spaced relationship to the object within a conveying pocket unless being acted upon by said weighing means or said activation means.

43. An apparatus for handling objects as set forth in claim 41, wherein said chain attachment assemblies are disposed on said chain such that successive of said objects being transported by said conveying means are substantially adjacent to one another.

44. An apparatus for handling objects as set forth in claim 41, wherein said mount further comprises fastening means which releasably secures said mount to an individual link of said chain.

45. An apparatus for handling objects as set forth in claim 41, wherein said roller assembly comprises:
an axle in mechanical communication with said mount such that said axle may rotate freely about its longitudinal axis; and
a pair of wheels each having a frusto-conical periphery disposed on and connected to opposite ends of said axle in spaced relationship to each other and oriented such that the larger diameter periphery of each wheel is adjacent one of the ends of the axle.

46. An apparatus for handling objects as set forth in claim 45, wherein said rotation control means comprises a roller rotation surface disposed adjacent said conveying path for engaging said wheels and imparting controlled rotation to said wheels, thereby imparting rotation to the object being supported thereon.

47. An apparatus for handling objects as set forth in claim 46, wherein said roller rotation surface has a predetermined length thereby imparting a predetermined degree of rotation to the object supported on said wheels.

48. An apparatus for handling objects as set forth in claim 41, wherein said weighing means comprises a ramp and a load cell disposed adjacent said conveying path, said ramp for engaging said discharge cradle and elevating said discharge cradle such that the object within a conveying pocket is captured thereon and elevated from the support of said roller assemblies and directing said discharge cradle to engagement with said load cell, said load cell for ascertaining the weight of the object captured by said discharge cradle.

49. An apparatus for handling objects as set forth in claim 41, wherein said discharge cradle has a peripheral configuration that generally conforms to the contour of the roller assemblies and occupies the space between said roller assemblies of adjacent pairs of chain attachment assemblies.

50. An apparatus for handling objects as set forth in claim 41, wherein said discharge cradle further comprises an orientation control surface for interaction with said activation means to pivot said discharge cradle and off-load onto said receiving means the object from the conveying pocket adjacent said discharge cradle.

51. An apparatus for handling objects as set forth in claim 50, wherein said activation means comprises a ramp and a selectively operable diverter arm each disposed adjacent the conveying path, said diverter arm having an activated position in which selected individual ones of said orientation control surfaces are directed into interaction with said ramp and a non-activated position in which said orientation control surface avoids interaction with said diverter arm and said ramp, said ramp being interactable with selected individual ones of said orientation control surfaces to pivot selected discharge cradles to off-load objects.

52. An apparatus for handling objects as set forth in claim 51, wherein said diverter arm is operated by a solenoid.

53. An apparatus for handling objects as set forth in claim 51, further comprising scanning means for scanning the surface of objects to ascertain characteristics of each object in transport along the conveying path.

54. An apparatus for handling objects as set forth in claim 53, wherein said scanning means is in communication with said activation means such that objects are off-loaded selectively in accordance with the characteristics of each object based on predetermined criteria.

55. An apparatus for handling objects as set forth in claim 53, wherein said scanning means comprises an optical scanning device.

56. An apparatus for handling objects as set forth in claim 53, wherein said scanning means comprises a solid state camera.

57. An apparatus for handling objects as set forth in claim 50, wherein said orientation control surface is located on a finger projecting from said discharge cradle.

58. An apparatus for handling objects as set forth in claim 41, wherein said discharge cradle is disposed between adjacent pairs of roller assemblies.

59. An apparatus for handling objects comprising:
conveying means for rotatably supporting and transporting the objects along a conveying path from an object input station to an object output station, comprising a frame, a chain movably suspended from said frame along said conveying path, said chain comprising a plurality of links connected to form an endless loop, and a plurality of chain attachment assemblies releasably secured to said chain and adjacent pairs of chain attachment assemblies defining individual conveying pockets, said chain attachment assemblies comprising:
a mount connected to said chain;
a roller assembly connected to said mount in vertically slidable and rotatable engagement;
a discharge cradle connected to said mount in vertically slidable and pivotal engagement;
rotation control means adjacent said path of travel of said conveying means for interacting with said conveying means to rotate the objects supported thereon;
weighing means for interacting with said conveying means to weigh each object;
activation means for selectively interacting with each discharge cradle for off-loading individual ones of the objects to remove selected objects from said conveying means; and
collection means located at said object output station for receiving the selected objects off-loaded from said conveying means.

60. An apparatus for handling objects as set forth in claim 59, wherein said discharge cradle is disposed in a retracted, subtending spaced relationship to the object within a conveying pocket unless being acted upon by said weighing means or said activation means.

61. An apparatus for handling objects as set forth in claim 59, wherein said chain attachment assemblies are disposed on said chain such that successive of said objects being transported by said conveying means are substantially adjacent to one another.

62. An apparatus for handling objects as set forth in claim 59, wherein said mount further comprises fastening means which releasably secures said mount to an individual link of said chain.

63. An apparatus for handling objects as set forth in claim 59, wherein said roller assembly comprises:
an axle in mechanical communication with said mount such that said axle may rotate freely about its longitudinal axis and may slide vertically; and
a pair of wheels each having a frusto-conical periphery disposed on and connected to opposite ends of said axle in spaced relationship to each other and oriented such that the larger diameter periphery of each wheel is adjacent one of the ends of the axle.

64. An apparatus for handling objects as set forth in claim 63, wherein rotation control means comprises a roller rotation surface disposed adjacent said conveying path for engaging said wheels and imparting controlled rotation to said wheels, thereby imparting rotation to the object being supported thereon.

65. An apparatus for handling objects as set forth in claim 64, wherein said roller rotation surface has a predetermined length thereby imparting a predetermined degree of rotation to the object supported on said wheels.

66. An apparatus, for handling objects as set forth in claim 59, wherein said weighing means comprises a ramp and a load cell disposed adjacent said conveying path, said ramp for engaging said discharge cradle and elevating said discharge cradle such that the object within a conveying pocket is captured thereon and elevated from the support of said roller assemblies and directing said discharge cradle to engagement with said load cell, said load cell for ascertaining the weight of the object captured by said discharge cradle.

67. An apparatus for handling objects as set forth in claim 59, wherein said the discharge cradle has a peripheral configuration that generally conforms to the contour of the roller assemblies and occupies the space between said roller assemblies of adjacent pairs of chain attachment assemblies.

68. An apparatus for handling objects as set forth in claim 59, wherein said discharge cradle further comprises an orientation control surface for interaction with said activation means to pivot said discharge cradle and off-load onto said receiving means the object from the conveying pocket adjacent said discharge cradle.

69. An apparatus for handling objects as set forth in claim 68, wherein said activation means comprises a ramp and a selectively operable diverter arm each disposed adjacent the conveying path, said diverter arm having an activated position in which selected individual ones of said orientation control surfaces are directed into interaction with said ramp and a non-activated position in which said orientation control surface avoids interaction with said diverter arm and said ramp, said ramp being interactable with selected individual ones of said orientation control surfaces to pivot selected discharge cradles to off-load objects.

70. An apparatus for handling objects as set forth in claim 69, wherein said diverter arm is operated by a solenoid.

71. An apparatus for handling objects as set forth in claim 68, wherein said orientation control surface is located on a finger projecting from said discharge cradle.

72. An apparatus for handling objects as set forth in claim 59, further comprising scanning means for scanning the surface of objects to ascertain characteristics of each object in transport along the conveying path.

73. An apparatus for handling objects as set forth in claim 72, wherein said scanning means is in communication with said activation means such that objects are off-loaded selectively in accordance with the characteristics of each object based on predetermined criteria.

74. An apparatus for handling objects as set forth in claim 72, wherein said scanning means comprises an optical scanning device.

75. An apparatus for handling objects as set forth in claim 72, wherein said scanning means comprises a solid state camera.

76. An apparatus for handling objects as set forth in claim 59, wherein said discharge cradle is disposed between adjacent pairs of roller assemblies.

* * * * *